US00RE36372E

United States Patent [19]

Edwards et al.

[11] E Patent Number: Re. 36,372

[45] Reissued Date of Patent: Nov. 2, 1999

[54] METHOD AND APPARATUS FOR MAKING A PILE ARTICLE AND THE PRODUCTS THEREOF

[75] Inventors: Donald William Edwards, Wilmington; James Kenton Odle, Newark; Peter Popper, Wilmington, all of Del.; Donald Montgomery Sadler, Parkside; Harold Francis Staunton, Avondale, both of Pa.; William Charles Walker, Wilmington, Del.; Paul Wesley Yngve, Chapin, S.C.; Todd James Savidge, Oxford, Pa.

[73] Assignee: E. I. du Pont de Nemours and Company, Wilmington, Del.

[21] Appl. No.: 08/979,972

[22] Filed: Nov. 26, 1997

Related U.S. Patent Documents

Reissue of:

[64] Patent No.: 5,547,732
Issued: Aug. 20, 1996
Appl. No.: 08/440,957
Filed: May 15, 1995

U.S. Applications:

[63] Continuation of application No. 08/017,162, Feb. 22, 1993, Pat. No. 5,472,762.

[51] Int. Cl.[6] ..... B32B 3/16; B32B 5/08; B32B 7/06; B32B 33/00

[52] U.S. Cl. ..... 428/85; 428/91; 428/92; 428/93; 428/95; 428/96; 156/72; 156/73.2; 156/166; 156/173; 156/271; 156/435

[58] Field of Search ..... 428/85, 91, 92, 428/93, 95, 96; 156/72, 73.2, 166, 173, 271, 435

[56] References Cited

U.S. PATENT DOCUMENTS

| | | | |
|---|---|---|---|
| Re. 30,359 | 8/1980 | Metzler | 156/169 |
| 1,195,949 | 8/1916 | Carney . | |
| 2,102,934 | 12/1937 | Arnold | 28/1 |
| 2,448,928 | 9/1948 | Stahl | 2/278 |
| 2,475,019 | 7/1949 | Faris . | |
| 2,602,765 | 7/1952 | Ahier et al. | 154/78 |
| 2,680,469 | 6/1954 | Ahier et al. . | |
| 2,698,044 | 12/1954 | Runton et al. . | |
| 2,698,045 | 12/1954 | Runton et al. . | |
| 2,738,296 | 3/1956 | Runton et al. . | |
| 2,796,654 | 6/1957 | Ashcroft | 28/72 |
| 3,009,235 | 11/1961 | Mestral | 28/78 |
| 3,511,745 | 5/1970 | Holzknecht . | |
| 3,583,057 | 6/1971 | Kolozsvary | 29/270 |
| 3,604,043 | 9/1971 | Lewis | 15/156 |
| 3,633,974 | 1/1972 | Lewis | 300/21 |
| 3,665,584 | 5/1972 | Erb | 29/410 |
| 3,677,851 | 7/1972 | Kayser . | |
| 3,715,878 | 2/1973 | Kim | 57/156 |
| 3,808,648 | 5/1974 | Billarant et al. | 24/204 |
| 3,947,306 | 3/1976 | Haemer | 156/72 |
| 4,015,036 | 3/1977 | Haemer | 428/88 |

(List continued on next page.)

FOREIGN PATENT DOCUMENTS

| | | | |
|---|---|---|---|
| 2384879 | 10/1978 | France | D04D 7/00 |
| 316435 | 8/1929 | United Kingdom . | |
| 396730 | 8/1933 | United Kingdom . | |
| 670334 | 4/1952 | United Kingdom . | |

OTHER PUBLICATIONS

Ultrafab, Inc. Farmington, NY, Brochure "Weatherstripping" (date unkown).

Ivor W. Boggiss, Carpet Installation Joint Venture Formed Using Hook and Loop Technology, *Floor Covering Weekly*, Nov. 16, 1992.

*Primary Examiner*—Terrel Morris

[57] ABSTRACT

An elongated pile article having a support strand for attachment to a plurality of yarn bundles, the yarn bundles including a dense portion with the filaments bonded to each other and bonded to the support strand, pile surface structure comprised of a plurality of elongated pile articles placed one next to the other, and a method and apparatus for making the elongated pile article.

58 Claims, 14 Drawing Sheets

U.S. PATENT DOCUMENTS

| | | | |
|---|---|---|---|
| 4,024,004 | 5/1977 | Metzler | 156/169 |
| 4,057,668 | 11/1977 | Metzler | 428/85 |
| 4,090,910 | 5/1978 | Metzler | 156/430 |
| 4,201,032 | 5/1980 | Sangalli | 53/522 |
| 4,221,833 | 9/1980 | Fuillermin et al. | 428/92 |
| 4,290,832 | 9/1981 | Kalleberg . | |
| 4,302,494 | 11/1981 | Horton | 428/95 |
| 4,770,917 | 9/1988 | Tochacek et al. | 428/95 |
| 4,775,310 | 10/1988 | Fischer | 425/308 |
| 4,794,028 | 12/1988 | Fischer | 428/100 |
| 4,872,243 | 10/1989 | Fischer | 24/442 |

METHOD AND APPARATUS FOR MAKING A PILE ARTICLE AND THE PRODUCTS THEREOF

Matter enclosed in heavy brackets [ ] appears in the original patent but forms no part of this reissue specification; matter printed in italics indicates the additions made by reissue.

BACKGROUND OF THE INVENTION

This is a continuation of application Ser. No. 08/017,162 filed Feb. 22, 1993, now U.S. Pat. No. 5,472,762.

The present invention relates to elongated pile articles that are useful as floor and wall covering when aligned with other elongated pile articles and attached to a backing substrate to make up a pile surface structure, and to methods of making an elongated pile article and a support mandrel useful in the process for making the article.

Conventionally, elongated pile articles have been made for use as a chenille-type yarn, as a pile weatherstripping, or made as part of a carpet-sized x-y array of support strands and pile yarn that emerges from the process as a finished carpet. The chenille-type yarns do not lend themselves to assembly into a carpet structure except by a time consuming expensive weaving process. The weatherstripping articles do not provide individual bundles of bulky yarn along a strand and are not designed to be made by a process using a continuous yarn source, and are not designed with a narrow strand for compact side-by-side assembly. The carpet-sized x-y array process is a complex process where it is difficult to control the process tension and bonding quality of individual pile articles, and it does not produce pile particles that can be used in a carpet to produce a high density of tufts/square inch. The strand width and pitch of the yarn on the strand are large compared to the diameter of the yarn bundle used. The process also does not lend itself to producing an intermediate upstanding pile article that can be packaged and sold as a feed material to carpet makers. The pile articles made by the x-y array process usually employ an adhesive to attach the yarn to the support strand and the pile article to a backing which adds another polymer component to the structure and is messy, difficult to process, and presents problems when the base materials of the article are to be recycled after use.

There is a need for a low cost elongated pile article comprising bundles of yarn arranged in a high density that can be made by a simple inexpensive method, and is designed to be packaged or used directly as a feed material for combining with a backing substrate for making a pile surface structure. There is also a need for a strong, reliable elongated pile article that can be packaged and handled in a carpet making process.

SUMMARY OF THE INVENTION

The pile article of this invention comprises a continuous length support strand having a peripheral surface, a reference plane tangent to a location on the surface of the support strand and a plurality of bundles of filaments secured to the support strand. Each of the bundles, which may be in loop form or in the form of individual tufts, has a dense portion of filaments bonded together and secured to the peripheral surface along said location on the peripheral surface. Each of the bundles form an angle with the reference plane.

The relationship of the bundles to each other along the support strand is defined by the distance between bundles along the support strand (pitch) and the diameter of the bundles. The pile article of the invention includes embodiments that may have features according to the following relationships:

1) Bundle Pitch/Bundle Diameter ratio (P/D) which describes the ratio between the distance between adjacent bundles of filaments along a length of support strand compared to the bundle diameter.
2) Support Strand width/Bundle Diameter Ratio (W/D) which describes the ratio between the width of the support strand compared to the bundle diameter.
3) Strand Area/Bundle Area Ratio (SA/BA ratio) which describes the relationship between a projected support strand area defined by the width of the strand times a unit length and the area of the yarn bundles along the unit length of the support strand.

The method for making the pile article of this invention comprises: feeding a continuous length of a bundle of filaments under tension along the center of rotation of an eccentric guide; rotating the guide to wrap said bundle of filaments around a hollow support having a plurality of elongated ridges to form loops of said bundles; feeding a continuous strand of material along one of said ridges between the support and the bundle of filaments being wrapped on the support; bonding the filaments in the bundle to each other and to the strand; cutting said loops to form the elongated pile article; and forwarding said elongated pile article for further processing.

The support mandrel for filaments wrapped around a strand comprises: an elongated body member with a plurality of elongated ridges, the body member having a central passage therethrough and having guides aligned with at least one elongated ridge for guiding a strand moving from said central passage along said ridge.

DETAILED DESCRIPTION OF ILLUSTRATED EMBODIMENTS

Figure 1:
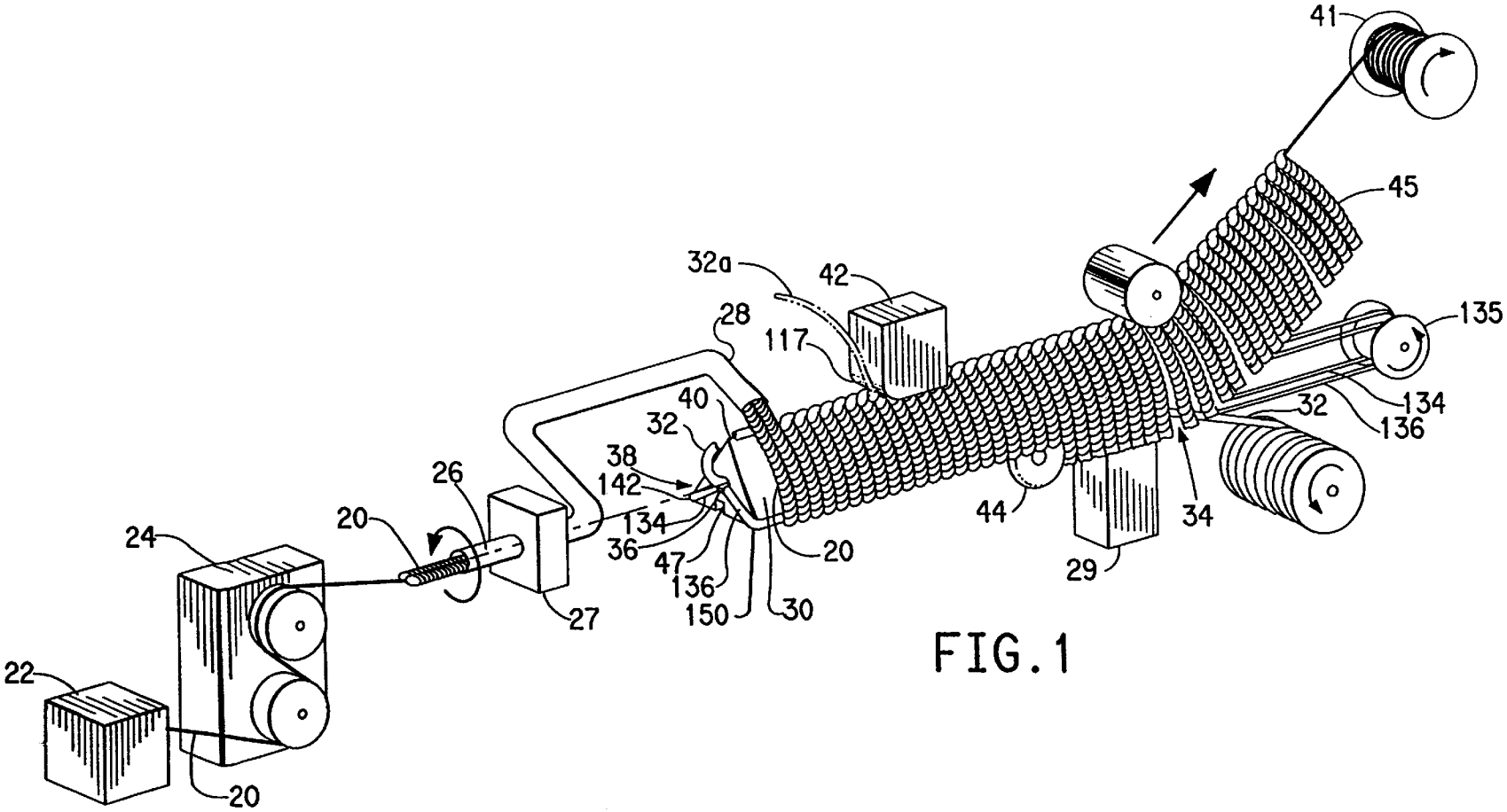
FIG. 1 is a diagramatic view of the process for making an elongated pile article.

Referring to FIG. 1, a yarn 20 is fed into the process from a source at 22 through tensioner 24. The yarn may typically be a multifilament, crimped, bulky, plied-twisted yarn that has been heat set to retain the ply-twist. The yarn is a thermoplastic polymer, such as nylon, polypropylene, etc. The yarn may be one or several ply-twisted lengths; two lengths are shown. The yarn 20 passes through a hollow guide conduit 26 that is rotated about its center. The conduit is bent to guide the yarn to a position at 28 radially displaced from the center of rotation. A mandrel 30 is supported at the center of rotation and accepts the yarn which is wound around the mandrel as it is fed from the conduit at 28. A slight twist may be imparted to the yarn as it passes through the rotating conduit so if two strands are used for the yarn source, the strands may have a low pitch wrap about one another as they leave the conduit at 28.

A support strand 32 is fed into the mandrel at 34 and through a passage 36 in the mandrel. The strand exits the passage at 38 where it is guided to the outside of the mandrel along ridge 40. The mandrel may have two, three, four or more such ridges where the yarn wrapping on the mandrel bends at an included angle between 0 and 180 degrees, preferably less than 90 degrees. A star-shaped mandrel with means to guide the yarn down between the peaks may be used to provide more than four ridges with the yarn bent to less than 90 degrees around the ridge. The yarn 20 is wrapped over the strand 32 which is pulled along the mandrel by the windup 41. Additional strands or yarn carriers, such as 134 and 136 propelled by motor driven pulley 135, are used to transport the yarn along the other ridges of the mandrel. It is important for controlled, uniform yarn movement that such transport means are provided for the yarn along each ridge of the mandrel. The yarn is wrapped under some tension so it conforms to the mandrel and is frictionally engaged with the strand and carriers for transporting before and after bonding. Frictional engagement with the strand the yarn is bonded to is not necessary after bonding. The wrapped yarn and strand travel together along the mandrel and under ultrasonic horn 42 where sufficient energy is imparted to the yarn that it is compacted, the multifilaments are fused together, and the yarn is fused to the support strand. When the yarn is bonded while bent around the mandrel, the yarn remains bent at the mandrel angle when removed. This bend is especially noticeable in the bundle filaments adjacent the bond that were pressed directly against the mandrel. The mandrel ridge 40 acts as an ultrasonic anvil surface. The wrapped yarn, now bonded to the strand, continues along the mandrel to cutter 44 (intermediate the mandrel ridges 142 and 150 and inserted in a cutter slot 47 in the mandrel) which severs the yarn to define individual bundles of yarn having opposed ends with each bundle attached to the strand intermediate the ends. The cut bundle is attached to one side of the strand at a location on the periphery of the strand and the ends are bent at acute angles at a base 73 to define two legs or tufts. The acute angles are measured relative to a reference plane 71 tangent to the location along the strand where the bundles are attached. The cut yarn unwraps from the mandrel between ridges 142 and 150 and allows access to the mandrel for mandrel support 29 and to feed in the strand at 34 as discussed. The basic elongated pile article or tuftstring 45 of FIG. 1 is now complete and can be wound up on a reel, piddled into a container, or fed directly to another piece of processing equipment. In an alternate embodiment shown in FIG. 9, three strands are bonded to the yarn and the assembly is cut once to remove it from the mandrel and is further cut to define the individual tuftstring.

Figure 16:
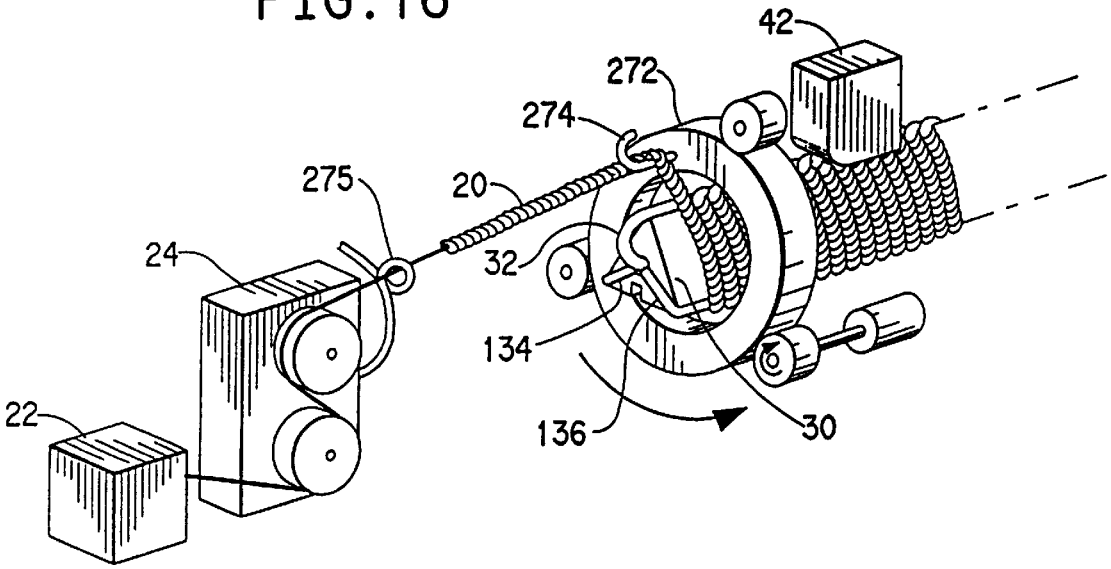
FIG. 16 shows a diagrammatic view of an alternate embodiment for wrapping yarn on the mandrel using a rotating ring and guide.

There are different ways possible for wrapping the yarn on the mandrel. For instance, in FIG. 16, the hollow guide conduit can be replaced with a motor driven ring 272 holding yarn guide 274 that guides the yarn onto mandrel 30 in the same way as in FIG. 1. The yarn 20 would still come from the source 22 that may provide an endless supply of yarn. An eyelet 275 from which the yarn is fed may or may not lie on the center of rotation of guide 274 or on the center of mandrel 30. This provides flexibility in locating yarn sources and gives easy access to the yarn 20 for making yarn product changes.

Figure 17:
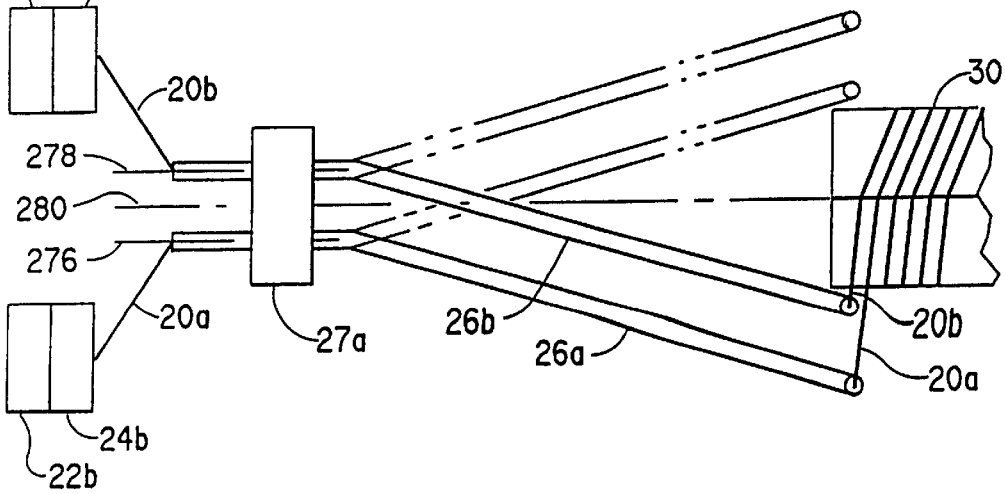
FIG. 17 shows a diagrammatic view of an alternate embodiment for wrapping a plurality of yarns using separate conduits spaced off-center from the mandrel.

Alternatively, in FIG. 17, there may be two or more hollow guide conduits used that rotate on centers, such as 276 and 278 that are not aligned with the center 280 of the mandrel. In this way several yarns can be wound on the mandrel simultaneously without ply twisting so a controlled blending of colors or yarn types can occur. Once again, the yarns 20a and 20b could still come from sources 22a and 22b that may provide endless supplies of yarns.

The mandrel of FIG. 1 can also be mounted in a way other than by support 29. For instance, the mandrel can be supported at the end where the yarn is wrapped-on by mounting the mandrel on rotary bearings on an extension of the rotating conduit 26 of FIG. 1. The mandrel could then be restrained from rotating by means known in the art, such as magnetic coupling with the rotary bearing support, or aligning one flat side of the mandrel with a flat belt that would travel at the speed of the support strands and yarn and assist in transporting the strands and yarn along the mandrel. The wrapped yarn on the mandrel may be cut as in FIG. 1, or the yarn may not be cut and instead allowed to feed off the unsupported end of the mandrel which is now opposite the end where the yarn is wrapped-on. In the latter case, the support would be bonded on the outside of the wrapped yarn, as shown in FIG. 1 for support strand 32a, and the elongated pile article could be a loop pile construction.

Figure 2A:
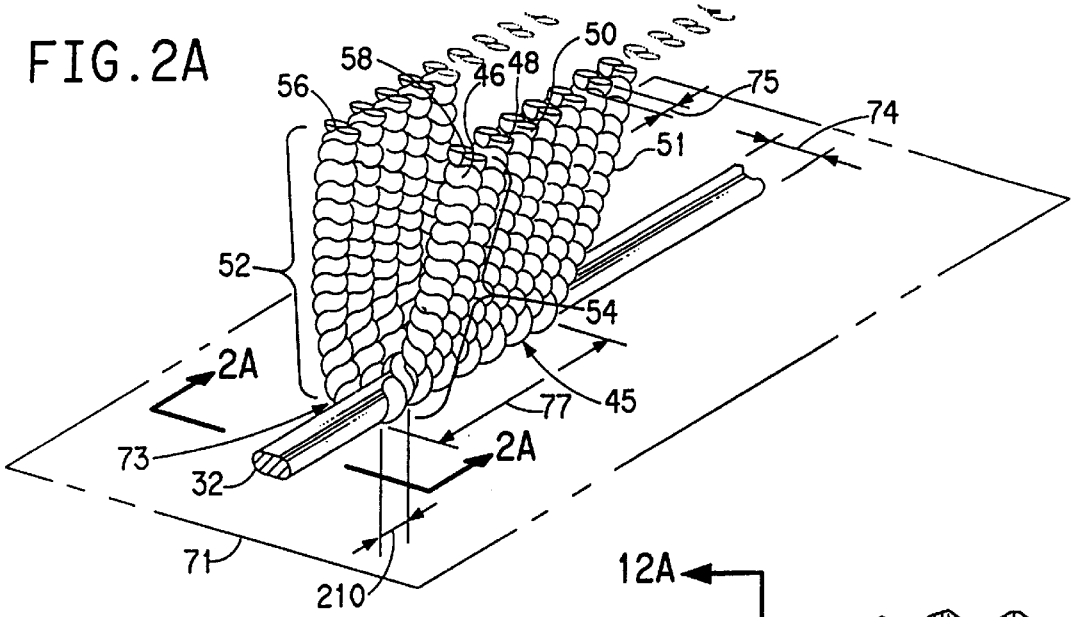
FIGS. 2A, 2B and 2C are perspective and different end views of an elongated pile article of this invention.
Figure 2B:
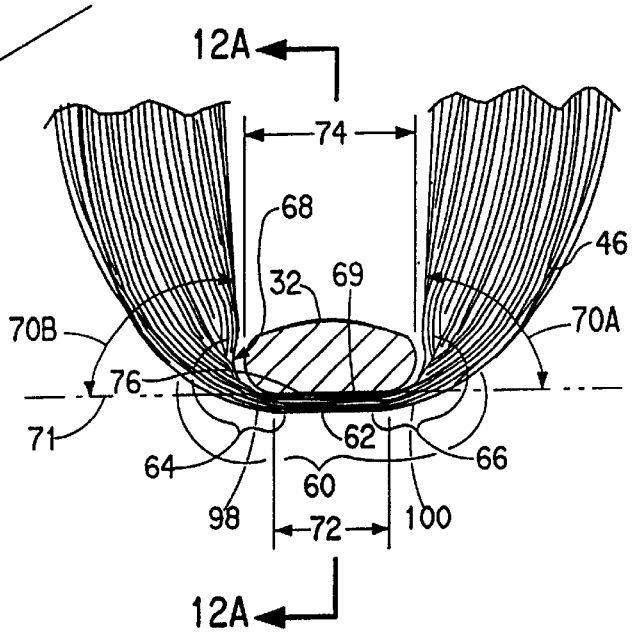
Figure 2C:
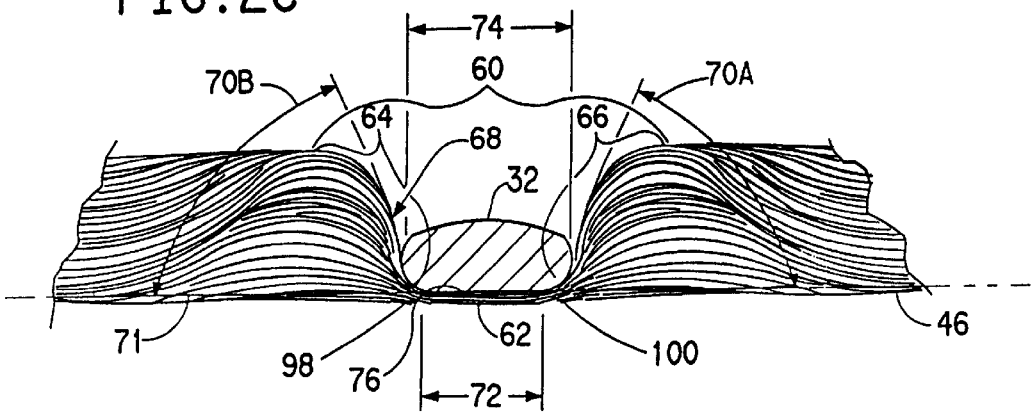

FIGS. 2A, 2B, and 2C show different views of a typical elongated pile article (tuftstring) 45 of the invention. FIG. 2A shows a plurality of bundles of yarn 46, 48, 50, etc. bent in a "U" share and attached to a support strand 32 at the inside of the "U". The bundle is bent to define a pair of upstanding legs or tufts 52 and 54 for bundle 46, the tufts attached at their base 73 to the strand 32. The cut ends 56 and 58 of the tufts 52 and 54 respectively fall in a plane common with the ends of the other tufts, although the ends may fall in different planes for different special effects.

FIG. 2B shows an enlarged partial end view of the tuftstring of FIG. 2A and FIG. 2C shows the tufts of FIG. 2B bent down to better study the bonded region; both figures show details of the bond of the bundle 46 to the strand 32. The bundle has, along its length, a compacted region of multifilaments 60 that has a dense portion 62 with the filaments bonded together, and opposed side portions 64 and 66 with surface filaments, such as at 68, set at acute angles 70a and 70b to the reference plane 71 at the base of the tufts. It is important that the inner filaments in the compacted region are set at an acute angle, and these filaments are "connected" to other filaments in the bundle so that the tufts are held upright during assembly of the pile article into carpet. The acute angle is preferably between 45 and 90 degrees to the reference plane 71 which is tangent to a location 69 on the periphery of the strand 32 where the surface of the support strand is bonded to the dense portion; more preferably the angle is about 60 degrees. The set-angle filaments may help return the tufts to an upright condition if the pile article is flat wound onto a tube, so the tufts are bent as in FIG. 2C, for storage and shipping to a carpet maker. The opposed side portions 64 and 66 lie next to, and on either side of, the dense portion. The dense portion has a width 72 that approaches the width 74 of the strand 32; the dense portion is bonded to one surface portion 76 of the peripheral surface of the strand 32. The width of the strand is the distance across the strand perpendicular to the strand length and parallel to the reference plane 71. Since the acute bend angle is greatest on the inner filaments at the inside of the bend, it is important that these inner filaments are "connected" to the remainder of the filaments throughout the yarn bundle to insure the entire bundle is held at the acute angle. Such connection can be accomplished in the supply yarn 20 by twisting, plying, alternate twist plying, fluid interlacing, application of a sizing adhesive or the like, mechanical entanglement, etc. Such connecting also results in a cohesion between the filaments in the supply yarn so that the identity of the supply yarn is retained after assembly with the support strand to form the tuftstring product, i.e. bundles of filaments can be identified in the tuftstring product. This is in contrast to a weatherstripping elongated pile article where there is no "connection" between the filaments in the supply yarn so that, after assembly with a support, there are no identifiable bundles of yarn. Such a condition is desirable for a weatherstripping where a homogeneous weather blocking barrier is desired, but is less desirable in a carpet where individual bundle definition is preferred.

Figure 3A:
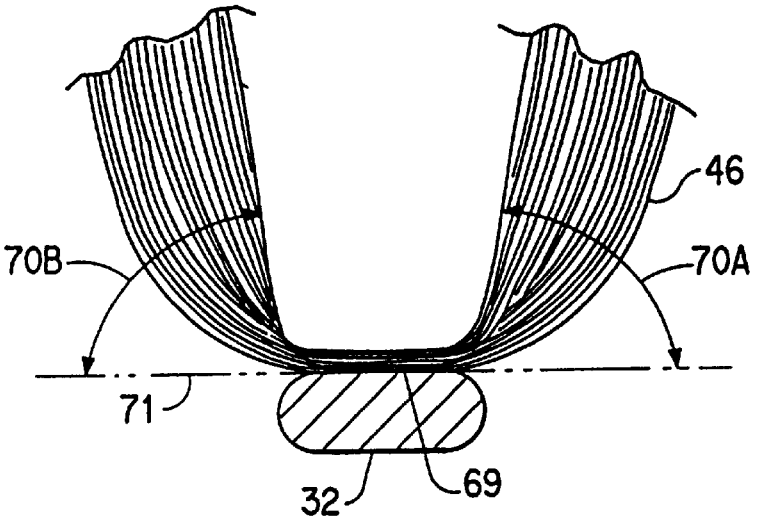
FIGS. 3A and 3B are end views of an alternate embodiment for the pile article of this invention.
Figure 3B:
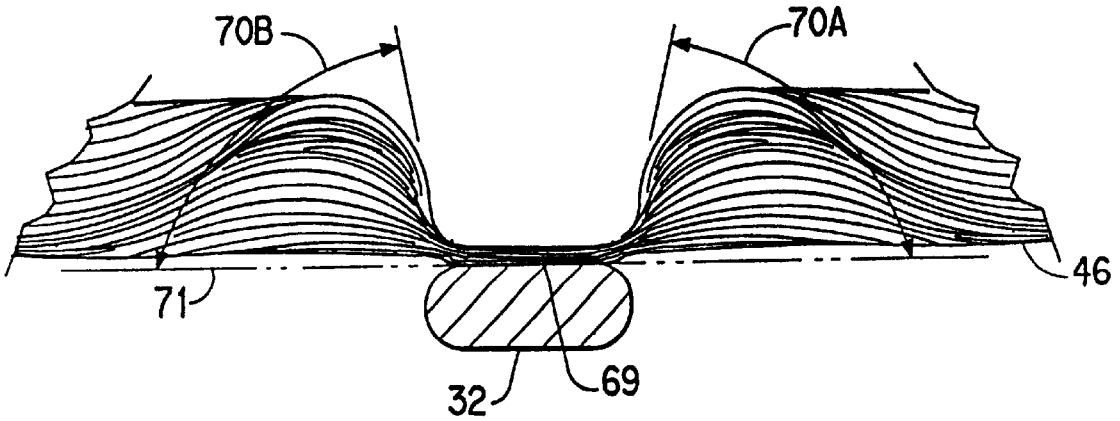

The strand is shown in the preferred position which is on the inside of the "U" shape, but the strand and bundle can also be attached with the strand on the outside of the "U" shape as is shown in FIGS. 3A and 3B. The characteristics of the bonded region remain the same as described with reference to FIGS. 2B and 2C. To produce the elongated pile article of FIGS. 3A and 3B, strands 32, 134 and 136 would be carrier strands, not bonded to the yarn, which would be made of a material having a higher melting point than the yarn (for instance, Kevlar® aramid fiber by Du Pont used with a yarn such as nylon) and the yarn 20 would be wrapped around the carriers and mandrel 30. A support strand 32a would be fed onto the yarn at the horn 42 and bonded to the yarn. The horn would have a shallow groove in the surface aligned with ridge 40 to guide the strand during the bonding operation.

The bonded region of the bundle has a structural feature that is important to the function of the elongated pile article when a plurality of them are assembled on a backing substrate to form a pile surface structure, or carpet. When a force is applied to a tuft (leg) of the pile article of the invention, the tuft breaks at the edge of the bond to the strand before the tuftstring pulls away from the backing substrate, i.e., the bundle is frangible adjacent each end of the dense portion 62. This is desired so major damage does not occur to the pile surface structure if a single tuft is snagged during use, such as by a vacuum cleaner, household pet, child's toy or the like. Loss of a single tuft would not be noticed in the carpet, but pull-out of a portion of a tuftstring by breaking the attachment to the backing would be very noticeable and would have to be timely repaired to prevent further damage. This feature of the tuftstring of the invention is achieved by proper bonding of the yarn bundle 46 to the strand 32 at the dense portion 62 of the compacted region 60 of the bundle. When done properly, the filaments at the edges of the width 72 of the dense region are thinned out at a frangible portion of the bundle at the base of the tuft, such as at 98 and 100, so the strength of the frangible portion is weaker than the strength of the bundle before bonding. It may also be desirable to have a single tuft pull off of the strand than to have the bundle separate from the strand thereby removing two tufts. When a single tuft on a conventional tufting-machine-made cut pile carpet is pulled, two tufts are removed. This can be avoided on a tuftstring-made carpet by making the frangible portion strength less than the strength of the bond between the bundle and the strand. That is, the tensile strength of the bundle is less than the shear or peel strength of the bond between the bundle and the strand. When one leg, or tuft, of the bundle is pulled it will fail by breaking at the thinned out frangible portion at the tuft base. If the bond is too weak, pulling on a single tuft may break the bond between the bundle 46 and the strand 32 and the entire bundle 46 including both tufts or legs 52 and 54 will come off the strand. This would be more noticeable in the pile surface structure than loss of a single tuft. If the bond is too strong and the bundle is lacking the frangible portion, pulling on one tuft allows the yarn bundle wrapped around the strand to act as a unit that may possibly pull the tuftstring away from the carpet backing.

The ultrasonic bonding can be controlled for instance, by varying the ultrasonic energy applied to the horn, the pressure between the horn and yarn, and the time a yarn bundle spends squeezed under the ultrasonic horn. Other variables, such as horn tip shape, ultrasonic frequency, and the addition of ultrasonic energy coupling agents (finishes) to the yarn filaments, can also be controlled. The bonding process for a given yarn can be varied to produce different density bonds having different thicknesses to achieve the desired frangibility. The density of the dense region of the bond may approach the density of the yarn polymer as the filaments are tightly squeezed together and heated by the action of the ultrasonic horn. It has been observed in some cases that the proper balance (between the frangible portion strength and the bundle-to-strand bond strength) occurs when there is some polymer "flash" or "debris" evident at the edges of the dense region of the bundle on the side where it contacted the ultrasonic horn. For example, a 2500 denier two-ply twisted strand had a frangible strength less than the bond strength when bonded with an ultrasonic driver at 40 KHz freq. and 1–2 mil/amplitude for about 1.0 second with a force of about 5 pounds between the horn and yarn. An ultrasonic driver that works well in this application is a Dukane Corp. model 40A351 power supply capable of 350 watts at 40 KHz, connected to a Dukane Corp. 41C28 transducer. A Dukane booster may also be used.

Bonding means other than ultrasonic bonding may be employed on the compacted portion of the bundle to bond the filaments to each other and to the strand. Such means may be solvent bonding or thermal bonding with, for instance, a hot bar; or some combination of solvent, conductive, and ultrasonic bonding.

Figure 8A:
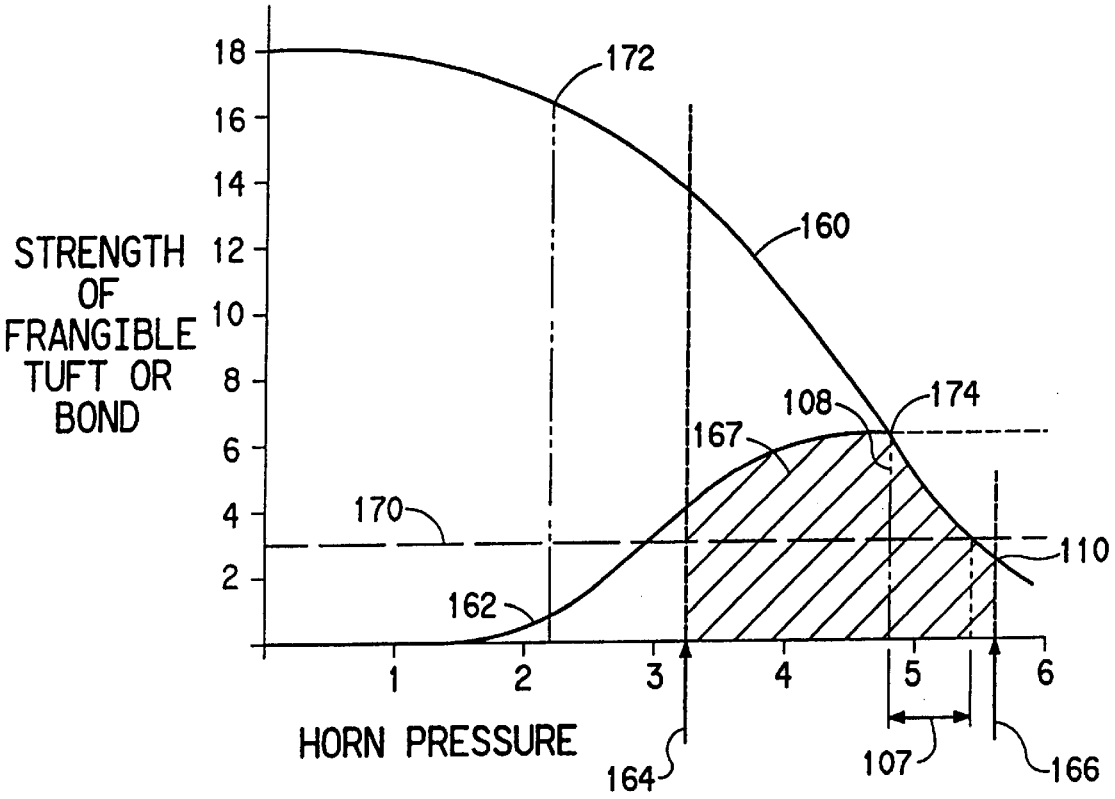
FIG. 8A is a graph relating tuft strength and bond strength to pressure exerted by the ultrasonic horn.
Figure 8B:
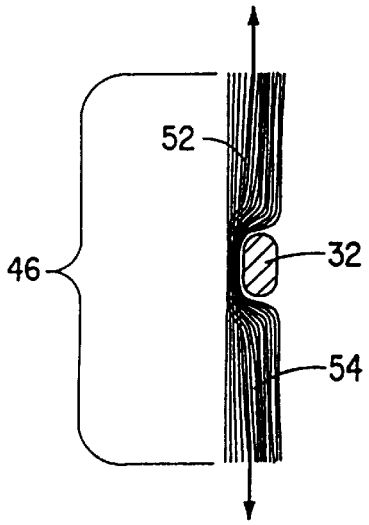
FIGS. 8B and 8C are schematic diagrams of the pile article illustrating application of force to test strength.
Figure 8C:
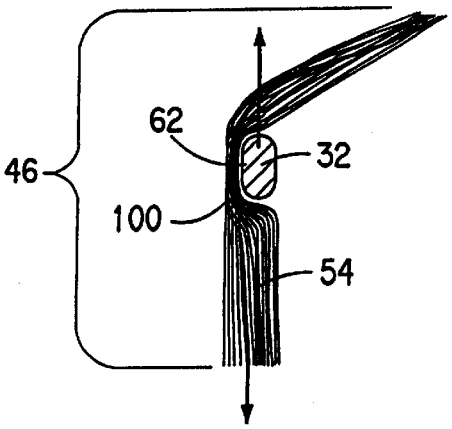

FIG. 8A shows how frangible yarn strength and bond strength are related to a controllable process parameter such as ultrasonic horn pressure. The plot is a hypothetical example based on limited test results for a ply twisted nylon carpet yarn attached to a nylon monofilament support strand assembled according to the process of FIG. 1. The curve 160 shows frangible yarn strength or tuft strength versus ultrasonic horn pressure and curve 162 shows bond strength versus horn pressure. The units on both axes are units of force. The information for tuft strength can be obtained by collecting samples made at different horn pressures and pulling on opposite ends of a single bundle 46 as in FIG. 8B and recording the force level when one of the tufts 52 or 54 separates from the bundle. The information for bond strength can be obtained by collecting samples made at different horn pressures and pulling on one tuft, such as 54, and on the strand 32 as in FIG. 8C and recording the force level when the bundle 46 separates from the strand due to bond failure at the dense portion 62. As the pressure increases, eventually the tuft 54 will begin separating from the strand at the frangible portion at 100 instead of the entire bundle separating, and here it is assumed the maximum bond strength has been reached.

There are upper and lower process limits for the process of FIG. 1 where runability cannot be sustained. The lower limit 164 represents a lower limit of horn pressure below which the bond strength is so low the tufts cannot be reliably cut by cutter 44 without separating from the support strand. The upper limit 166 represents an upper limit of horn pressure above which the bonding is disruptive to the process by causing sticking of displaced polymer in the bond to the mandrel 30, or where the frangible portion is so weak that individual tufts separate from the strand during cutting. Between the lower and upper limits 164 and 166, respectively, is a hatched area 167 where the process can run to make tuftstring having the strength of the yarn diminished at the bond to the strand.

A preferred region of operation when making pile articles for carpet, is at 107 between lines 108 and 110 where the tuft strength 160 falls below the bond strength 162, but above a minimum tuft strength level 170. A minimum tuft strength level may be that which is required for good tuft pullout resistance in an end use such as a carpet. In the example shown, the tuft strength should fall between about 50% and 100% of the maximum bond strength, or preferably between about 60% and 80%. Note that the curve 160 for frangible tuft strength starts out before bonding equal to the yarn strength, begins decreasing at about 172 as the bond strength increases and the yarn is compacted in the bond, and falls to below the bond strength at 174 as the bond strength increases to a maximum and the yarn is further deformed at the dense portion of the bond.

Figure 4B:
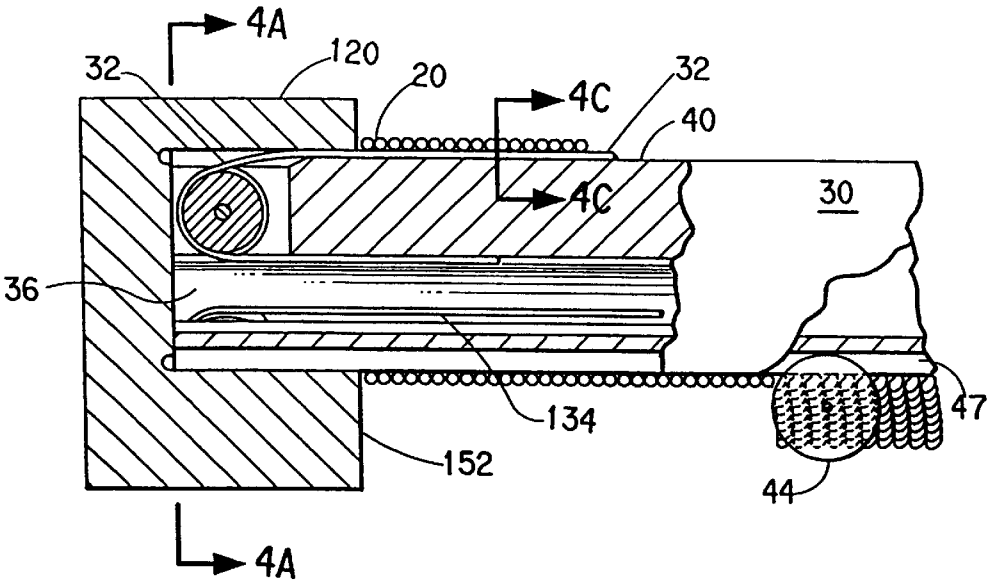
FIGS. 4A, 4B and 4C are sectioned end and side views of a support mandrel useful in making the elongated pile article of this invention.
Figure 4C:
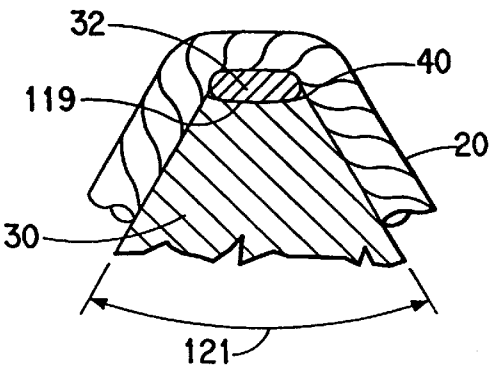
Figure 4A:
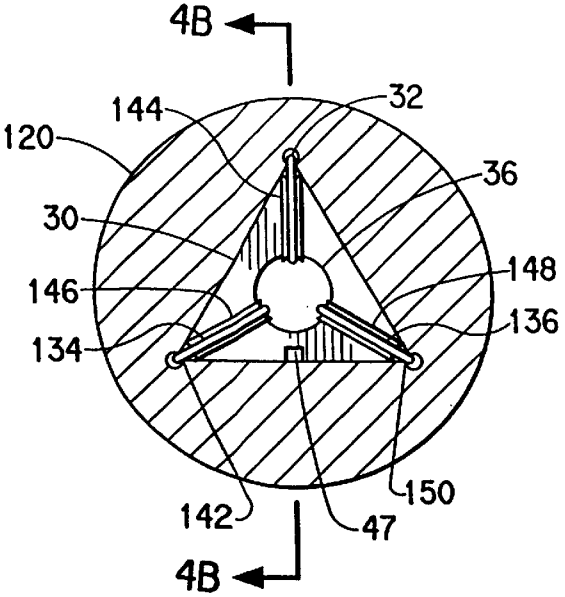

FIGS. 4A and 4B show details of the mandrel 30 and mandrel cap 120 (not shown for clarity in FIG. 1). Mandrel 30 has passage 36 extending throughout its length to convey strand 32 inside mandrel 30. Carriers 134 and 136 also are conveyed through passage 36. At the unsupported end of mandrel 30 are pulleys 144, 146 and 148 that guide the strand and carriers from passage 36 to the outside ridges 40, 142, and 150 of the mandrel 30 respectively. A low friction curved surface may also act as a guide for the strand and carriers. Cap 120 is attached to the end of mandrel 30 to assist in guiding the strand and carriers along the ridges and to provide a shoulder 152 to limit any tendency for the yarn 20 to move toward the unsupported end of the mandrel, particularly during a process upset.

FIG. 4C shows how the strand 32 and yarn 20 are arranged over ridge 40 on mandrel 30. The ridge has a guide surface 119 that engages the contour of the strand to support it while under tension so it does not slip to either side of the ridge. For the slightly elliptical shape shown for the strand 32, the surface 119 of the ridge is a slightly concave curved surface which also restrains the strand from lateral movement during ultrasonic bonding. Since the mandrel in this embodiment is a three-sided prism, the included angle 121 over which the yarn 20 is bent is about 60 degrees. The yarn conforms to the mandrel and strand since it is wrapped on the mandrel under a slight tension caused by tensioner 24 and friction drag in conduit 26. During bonding, the cross-section of the strand and dense portion of the yarn bundle attached thereto may take on a shape defined by the surface of the horn and anvil. For instance in the process shown in FIG. 1, the rectangular strand 32 is supported by the anvil 30 having a slightly concave surface 119 as seen in FIG. 4C; and the yarn is squeezed by a horn 42 with a flat surface 117. The result is seen in the cross-sections of the strand 32 and dense portion 62 in FIGS. 2B and 2C. When a strand having a round cross-section was fed into the process of FIG. 1 and a good bond was produced, it resulted in nearly the same cross-section shape of strand and dense portion found in FIGS. 2B and 2C; the initial round shape of the strand was no longer evident and the strand and dense portion of yarn had taken on a rectangular shape cross-section.

Figure 7:
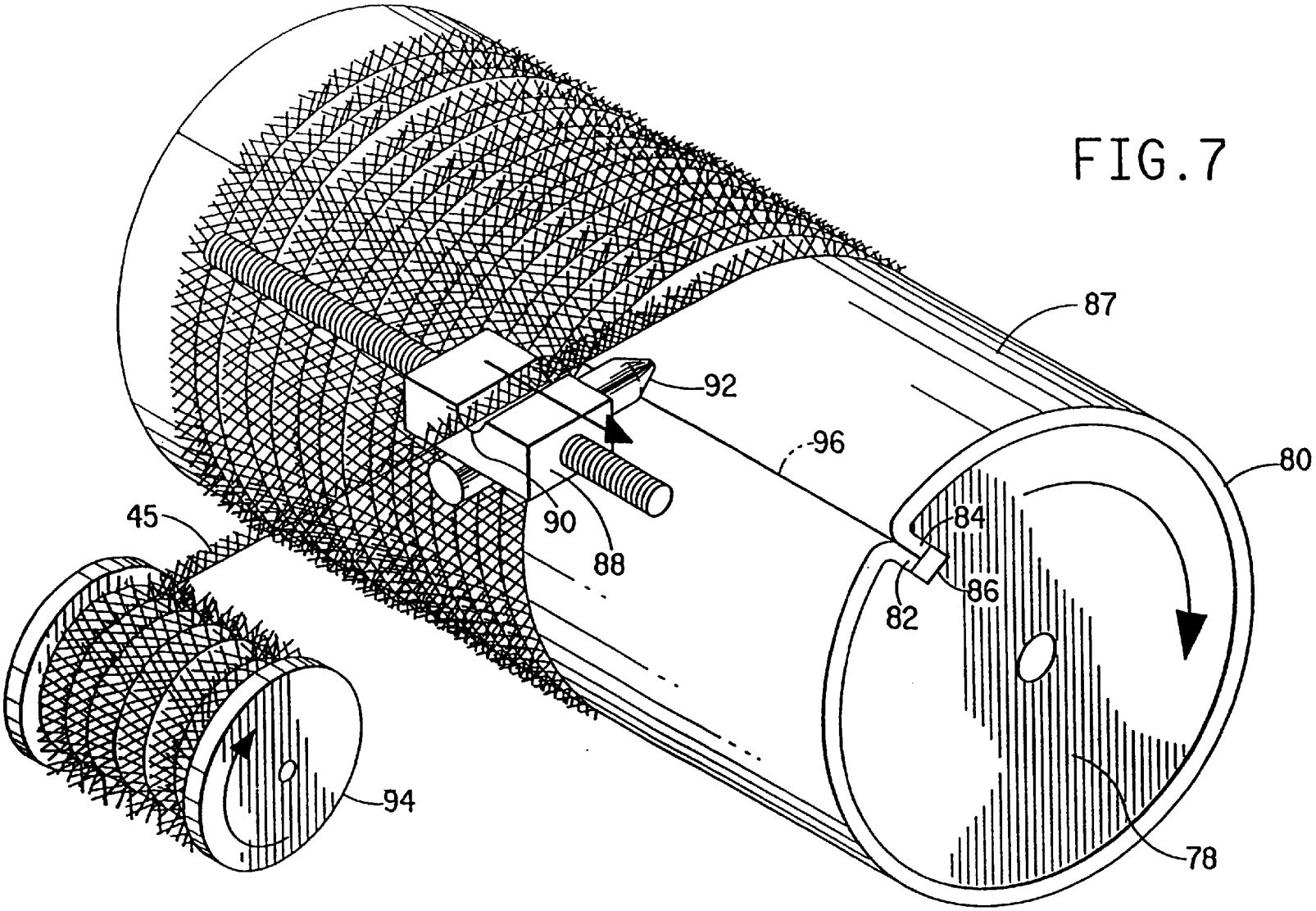
FIG. 7 is a diagramatic illustration of a method of making a carpet from the elongated pile article of this invention.

FIG. 7 shows a method to make carpet using the tuftstring of the invention. A drum 78 is set up for rotation with a backing material 80 attached, for instance, by clamping the ends 82 and 84 of the backing in a slot 86 in the drum. The surface 87 of the backing facing outward would be coated with an adhesive coating, such as a thermoplastic adhesive. A block 88 is set to traverse along the rotational axis of the drum and carry a tuftstring guide 90 and a heating means 92 to locally soften the thermoplastic adhesive just before or coincident with contact with the tuftstring; such heating means may be a hot air jet, radiant heater, flame, or the like. The tuftstring 45 could be supplied from a reel 94 or directly from mandrel 30 of FIG. 1. As drum 80 is rotated clockwise, the tuftstring is pulled through guide 90, and heating means 92 locally heats the adhesive surface 87 on the backing 80. The tuftstring contacts the hot adhesive and is bonded to the backing. The block slowly traverses along the drum axis and lays down a spiral array of tuftstring to the backing surface, with adjacent runs of the spiral closely spaced so the just-applied tuftstring lies close to the previously-applied tuftstring in the array to define a pile surface structure. After the tuftstring has been traversed the length of the drum axis, the winding is stopped, and the assembly of tuftstring and backing is cut along the drum axis, such as at line 96 where the two backing ends come together at slot 86. In this embodiment shown, only the tuftstring need be cut at 96 and the backing ends released to remove the assembly. The assembly can then be removed from the drum and laid flat to form a pile surface structure or carpet. The carpet product made by this method has the feature that the adjacent rows of tuftstring come from different elongated portions of the same tuftstring which eliminates yarn lot variations within the carpet. For instance, a carpet having about 3.3 oz/ft2 of yarn can be produced by first making a tuftstring from 2350 denier, two strand, ply twisted yarn wrapped along the strand at 15 wraps/inch and a 5/8 inch tuft length, and then mounting the tuftstring on the backing at a pitch of 5 tuftstrings/inch. Very little yarn is wasted since most of the yarn appears above the strand. For instance, with a 0.055 inch wide strand, the length of "wasted" yarn is only that which is wrapped around the strand, which for this example is about 1/16 inch out of a bundle length of 21/16 inch, or about 4.7%. This makes more efficient use of the yarn compared to a conventional tufted carpet that for this case would have about 7.4% of the yarn below the backing.

Figure 10:
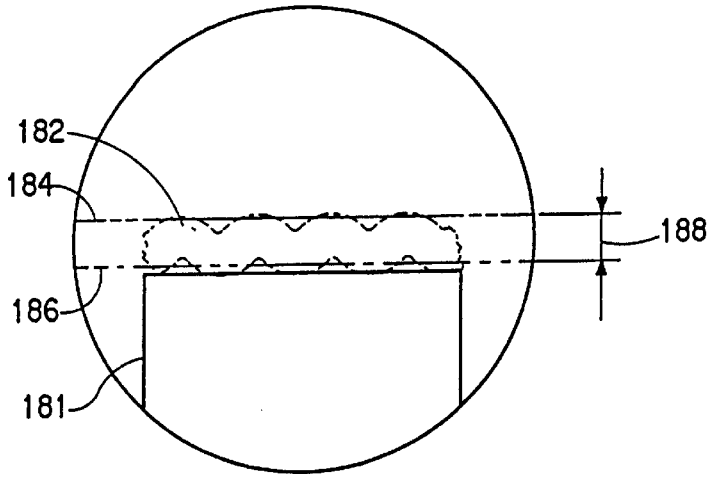
FIG. 10 is a diagram showing one way to measure the diameter of a pile yarn.

Numerous features of the tuftstring of the invention are unique and are important when it is used to make a pile surface structure. Unique geometry features are reflected in a unique tuft distribution in a standard carpet array made from the tuftstring. In a conventional residential carpet made on a tufting machine, the yarn is threaded through hundreds of equally spaced needles on a needle bar and the backing is indexed past the needle bar in equal increments. When the backing is stopped, the needles pierce the backing and carry a loop of yarn through the backing. The needles are then withdrawn and the yarn loop is left behind forming a tuft, or the loop is cut forming a cut pile surface made up of pairs of individual tufts. A popular array of yarn tufts in such a carpet is a so-called "balanced" one where the needles are on 1/10 inch spacing (gage) and the backing is indexed at 1/10 inch increments (stitches/inch). This produces a 10×10 array of needle holes or loops of yarn. When the loops are cut, the individual tuft array becomes 10×20. In the carpet industry, a tuft is defined as the cut or uncut loops forming the face of a tufted or woven carpet. It is desirable to be able to make this same tuft array using the tuftstring of the invention. This is accomplished by the unique geometry described below which is presented "normalized" by expressing dimensional features as a ratio to the free yarn bundle diameter. The yarn bundle diameter is a parameter that has a lot to do with the ability of the yarn to cover the floor in an efficient manner, especially in a cut pile carpet construction. For repeatability in measuring, the yarn bundle diameter is the untensioned average diameter of a one inch long straightened section of yarn bundle remote from cut ends to avoid the ambiguity that flaring of the cut ends may cause when making a measurement. The yarn bundle diameter can be repeatably measured using a microscope with grid lines or an optical comparator, such as an "Qualifier 30" made by Opticom. FIG. 10 shows a view of the yarn on the Qualifier 30. A one inch piece of straight yarn with no cut end flare (which may be straightened with very low tension that does not appreciably compact the yarn) is placed on top of a flat block 181 located in the light path of the comparator. At a 20×magnification, the sample 182 is aligned with a horizontal line 184 on the comparator screen that is passed through the peaks and valleys along the edge of the sample to define an average edge location. The line is moved to the opposite average edge of the yarn at position 186 and the distance moved 188 is recorded as the average "diameter" of the one inch long sample. This may be repeated with several samples of the supply yarn to further average the "diameter". In the case where there are different diameter bundles along the strand, the bundle diameter would be the average diameter of all the different bundle diameters along a representative length where the pattern of different diameters repeats.

BUNDLE PITCH/BUNDLE DIAMETER RATIO (P/D ratio)

This describes the distance between adjacent bundles of yarn (pitch) laid along a length of support strand compared to the yarn bundle diameter. The unique process of the invention allows the product to have a much denser distribution of bundles along the strand than other elongated pile articles taught in the art. When the yarn is wound onto the support strand there are at least three methods of achieving a high density of bundles on the strand: one is to apply enough tension to the yarn bundle that the diameter necks down so, when the necked down yarns are laid abutted along the strand, the pitch is less than the free untensioned bundle diameter; another is to wind multiple layers of yarn bundles on the strand; and a third is a combination of the first two. It is desirable, when making a carpet similar to the tufting machine carpet mentioned above, to use a pitch of 1/20 inch (20 bundles/inch) and a yarn with a diameter of about 0.114". This gives a P/D ratio of 0.05"/0.114"=0.44. The highest P/D ratio that may make an acceptable low value carpet would be P/D=1.0 where the bundles are spaced at a pitch equal to the bundle diameter. This could be made with yarns wrapped under low tension and abutted along the strand. The tuftstring method invention teaches how to make tuftstrings with P/D ratios less than 1.0; accordingly, the P/D ratio for the tuftstring of the invention is P/D<1.0 or P<1.0 D. Preferably, the P/D ratio is less than 0.7 and more preferably it is less than 0.5. This invention makes possible a dense pile carpet without having to rely on flaring of the cut tuft to get good coverage in a carpet made from elongated pile articles; desirable tuft definition and integrity are maintained.

Figure 12A:
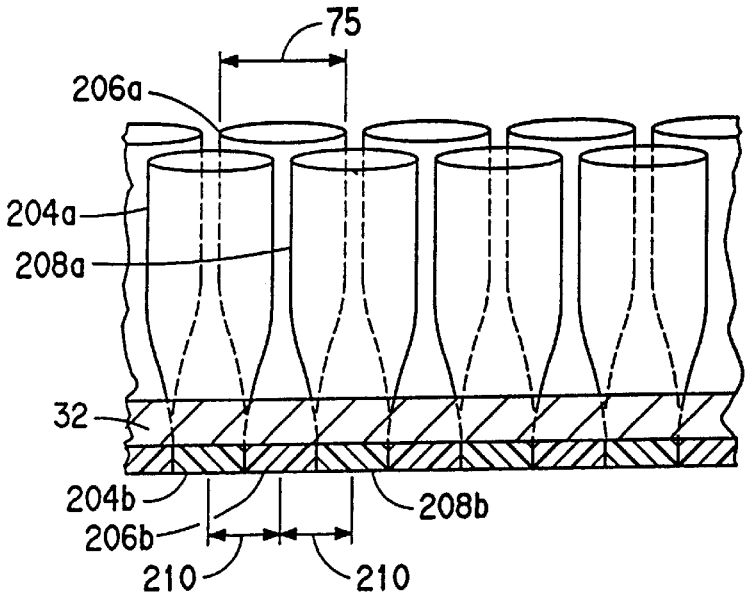
FIG. 12A is a simplified representation of a section along the center of a tuftstring support strand showing bundles bonded to the strand in a single layer.
Figure 12B:
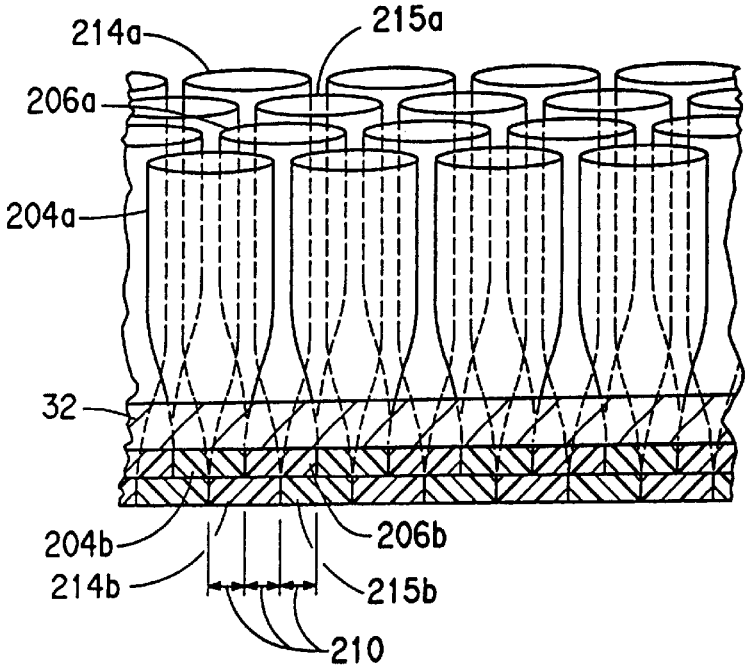
FIG. 12B is a simplified representation of a section along the center of a tuftstring support strand showing bundles bonded to the strand in an overlapping relationship.

The P/D ratio can be further appreciated referring to FIGS. 12A and 12B. The bundles of yarn are shown on the far side of the strand 32 as tufts, such as 204a, 206a, and 208a and under the strand 32 as dense portions of the bonded bundle, such as 204b, 206b, and 208b. The pitch "P" of the bundles along the strand is best understood referring to FIG. 12A and looking at the abutted center-to-center spacing or pitch 210 between the dense bonded portions of adjacent bundles; it is preferred to measure pitch here instead of at the end of the tuft since the tuft ends are somewhat free to move about. The diameter of the bundle "D" is represented by the distance across an untensioned bundle or diameter 75. The pitch may have to be averaged along a one inch length to get an representative number as some local variations are to be expected. FIG. 12B shows how the pitch is determined when there are multiple layers of bundles along the strand and the dense portions of the bundle bonds may overlap one another. Bundle tufts, such as 204a, 206a, 214a, and 215a are shown above strand 32 and the overlapped dense portions of the bundle bonds for these bundles are shown below the strand 32, such as dense portions 204b, 206b, 214b, and 215b, respectively. The pitch "P" is the distance between adjacent dense portions of bundles successively placed along the strand at pitch 210. Once again, the number of bundle bonds along a one inch section may need to be averaged to get a representative number for "P". In the case where there are different diameter bundles along the strand, perhaps causing the pitch to vary considerably, the pitch would be an average represented by the reciprocal of the number of bundles per a representative length where the pattern of different diameters repeats.

SUPPORT STRAND WIDTH/BUNDLE DIAMETER RATIO (W/D ratio)

The width of the support strand is an important parameter in the invention for the following reasons: 1) if it is too wide it may be seen between the tufts on a single tuftstring which is undesirable in a carpet structure, 2) if it is too wide it may cause the spacing between adjacent tuftstrings to be excessive when making a pile surface structure so a dense array of yarn tufts in a carpet cannot be achieved, 3) if it is too narrow, the area for bonding the yarn bundle to the strand surface may be too small for a repeatable strong bond and the tuftstring may be difficult to handle for bonding to a yarn bundle or to a carpet backing. The tuftstring method invention teaches how to attach yarn bundles reliably to a narrow support strand. The strand width for the tuftstring of the invention is accordingly less than the average yarn bundle diameter, or W/D<1.0, which can also be stated as W<D. For instance, for a strand width of 0.055" and a bundle diameter of 0.114", the W/D ratio is 0.48. Preferably, the ratio W/D is less than 0.7 for good hiding of the strand and close placement of adjacent tuftstrings in a pile surface structure. More preferably, the W/D ratio is less than 0.5. A strand width of 0.032, giving a W/D ratio of 0.28, has also been found to work well.

The W/D ratio may be further understood referring to FIG. 2A where the strand width "W" is shown as 74 and the distance across the yarn bundle or diameter "D" is shown as 75.

STRAND AREA/BUNDLE AREA RATIO (As/Ab ratio)

In some cases a W/D ratio greater than 1.0 may provide a good pile surface structure where, for instance, a small diameter yarn bundle is wrapped in multiple layers around the support strand during forming to provide a small P/D ratio and compensate for not using a large bundle of yarn. Conversely, a P/D ratio greater than 1.0 may provide a good pile surface structure where a large diameter yarn bundle is spaced along a narrow support strand to provide a small W/D ratio; to compensate, adjacent tuftstrings could be located closely together in the carpet so the spaced yarn bundles are nested together. In these cases, the tuftstring of the invention can be designed by using a As/Ab ratio where the projected area of a unit length of support strand is compared to the sum of the areas of the cut yarn bundle ends attached along that unit length. For a loop pile, assume the projected area is the same as if the yarn was cut as in a cut pile. For a tuftstring with a variety of yarn diameters along a length, calculate the total area by adding the areas for all the different tuft diameters along the length.

Strand area, $As = W \times L$

Yarn area, Ab = area of 1 tuft end dia × # single tufts along length L $$As/Ab = (\pi D^2/4) \times 2(L/P)$$
$$= (W \times L)/[(\pi D^2/4) \times (2(L/P)]$$
$$= W \times 2P/(\pi D^2)$$
$$= 2/\pi(W/D)(P/D)$$

if W/D and P/D both approach a limit of 1.0, then:

-continued $$As/Ab < 2/\pi \text{ or } 0.64$$

As/Ab equal to 0.64 represents the case where the support strand is wide and the pitch of bundles on the strand is large, i.e. there are few bundles per unit length. For a case where there are 20 bundles/inch of a 0.114" diameter bundle attached to a 0.055" wide strand, the As/Ab ratio is 0.19. Preferably, As/Ab is less than 0.3, and most preferably it is less than 0.2 for a tuftstring for making a high value carpet with a dense pile surface where the low area of the support strand cannot be seen through the high area of tuft ends.

The As/Ab ratio may be further understood referring to FIG. 2A where the strand width "W" is shown at 74. The bundle pitch "P" is shown at 210, the yarn bundle diameter "D" is shown at 75, and the unit length "L" along the strand is shown at 77.

Figure 13:
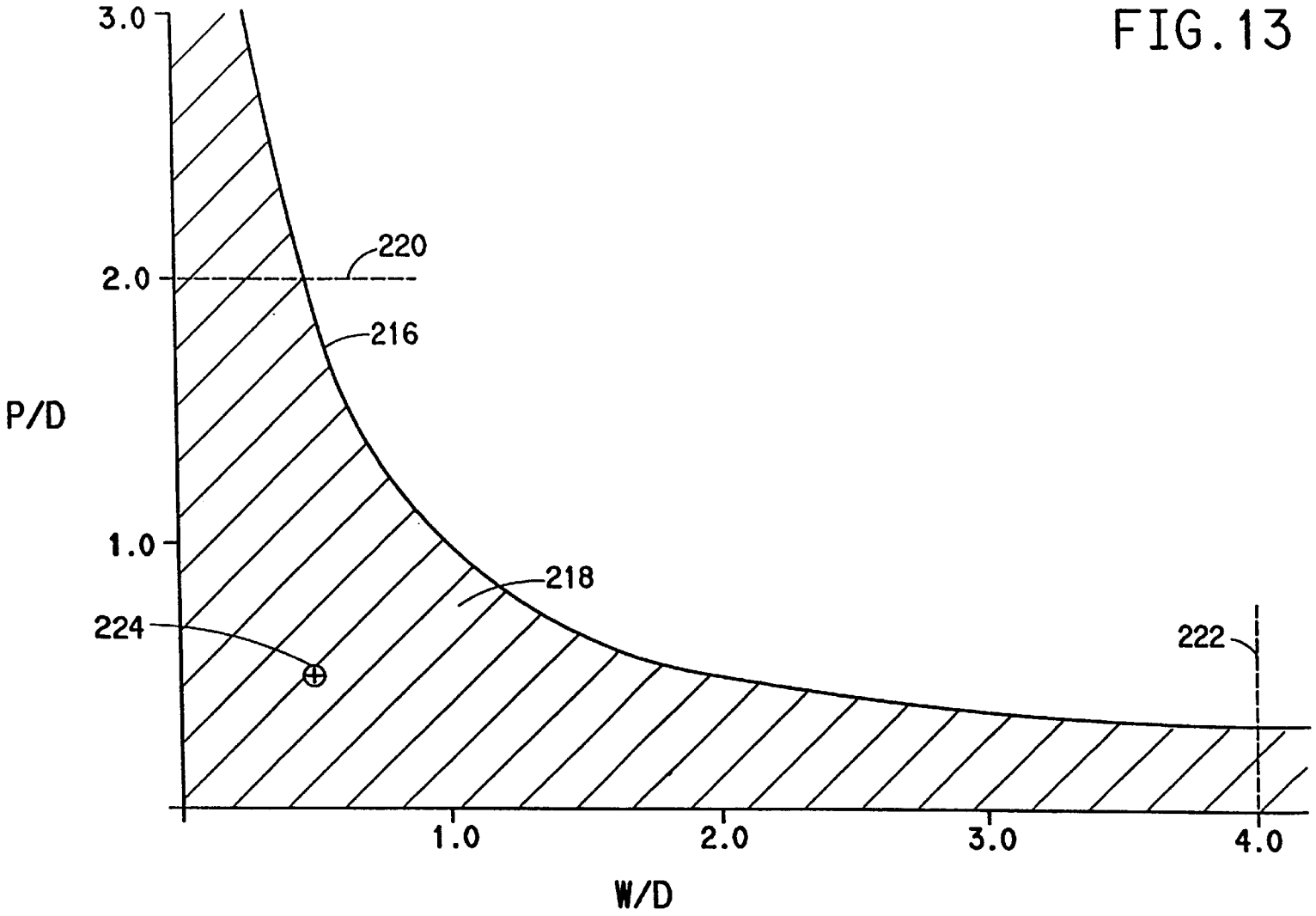
FIG. 13 is a graph of the ratio of P/D vs. W/D to assist in illustrating the inventive concept.

FIG. 13 graphically describes the use of the area ratio to design one embodiment of the tuftstring of the invention. Solving the equation As/Ab=2/π (W/D) (P/D) for P/D, results in the following:

$$P/D=(\pi/2)\ (As/Ab)/(W/D)$$

for $$As/Ab=2/\pi,\ P/D=1/(W/D)$$

Graphing this equation with P/D on the vertical axis and W/D on the horizontal axis produces the graph of FIG. 13. For the embodiment of the tuftstring of the invention where As/Ab<2/pi, the values of P/D and W/D will fall below the curve 216 in the shaded area 218. The graph shows that a high value for P/D can be compensated for by a correspondingly low value for W/D that will allow more tuftstrings/inch to be arranged in the carpet; also a high value for W/D can be compensated for by a correspondingly low value for P/D where there are more tufts/inch along the strand. For most carpet constructions, P/D would ordinarily not exceed 2.0, and W/D would not exceed 4.0 shown by dashed lines 220 and 222 respectively, most preferably P/D and W/D would not exceed 1.0. There may also be some very low limits for P/D and W/D where the narrow strand width would be difficult to handle or multiple layers of small diameter yarn would be difficult to handle; such limits have not yet been identified, however. The data point 224 shows As/Ab=0.19 as previously discussed for a high value carpet.

FRANGIBLE TUFT STRENGTH

This feature of the tuftstring of the invention, as already discussed, may be useful for producing a "failsafe" carpet structure where the bond of the bundle to the strand can be tailored so that the pullout strength of a single tuft is less than the strength of a bundle of filaments before bonding. This allows the tuft pullout force to be adjusted so the tuft fails before the tuftstring structure pulls away from the carpet backing. At the low end, the tuft pullout force should exceed the normal requirements for carpet usage established by HUD (Housing and Urban Development product standards for carpet) and ASTM (American Society for Testing and Materials). It is also desirable that the pullout strength of a single tuft is less than the bond strength for the yarn bundle so the bundle does not separate from the strand thereby removing two tufts from the carpet. This is a unique feature that allows: 1) the tufts to withstand normal wear and tear, and 2) minimizes the damage caused by unusual forces pulling on the tufts. In conventional cut pile carpets made on a tufting machine, excess force on a single tuft causes a bundle, which includes two tufts, to pullout. With the frangible tuft feature of the invention, excess force on a single tuft may only cause that one tuft to pullout, thereby minimizing the damage to the carpet. In pile surface structures where this feature is not desirable, the bond can be tailored using the process of the invention so the tuft strength is increased to equal or exceed the bundle bond strength, but still be less than the strength of the bundle filaments before bonding. To summarize:

TUFT STRENGTH < YARN STRENGTH prefer: MIN PULLOUT < TUFT STRENGTH < BOND STRENGTH

TUFT DISTRIBUTION IN CARPET

Figure 11B:
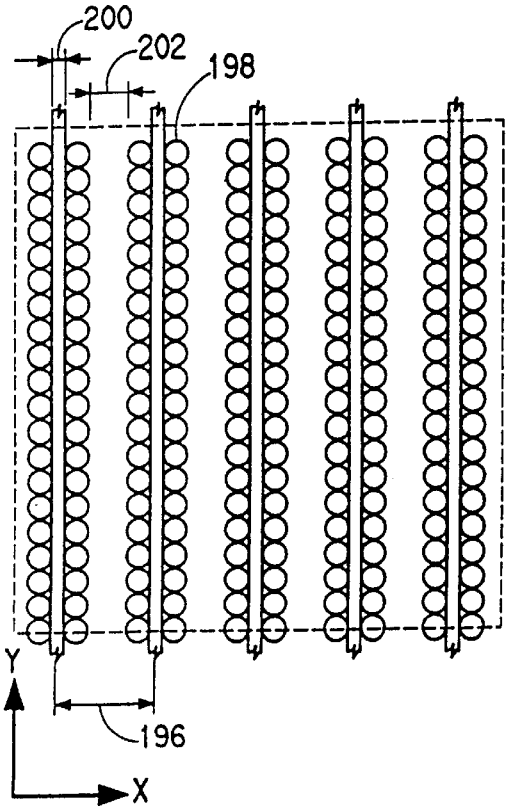
FIG. 11B is a simplified representation of the tuft distribution in a carpet made from the tuftstring of the invention.
Figure 11A:
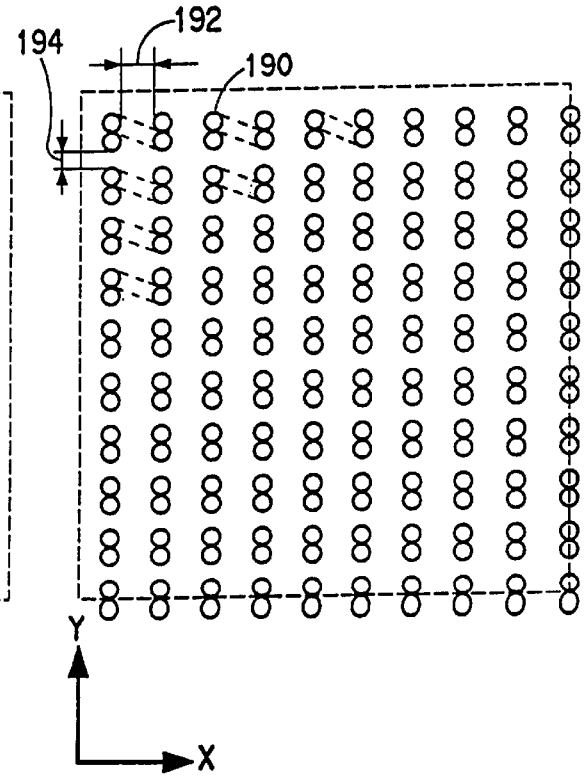
FIG. 11A is a simplified representation of the tuft distribution in a tufting-machine-made carpet.

The carpet made using the tuftstring of the invention has a unique distribution of tufts when examined at the base of the tufts next to the carpet backing, or next to the support strand in the case of the tuftstring. FIG. 11A represents the base of the tufts of a tufting-machine-made cut pile carpet and shows the distribution of tufts in one square inch of backing. The bases of the tufts at the top surface of the backing are represented by circles 190. Note that they appear distributed as pairs since there are two tufts in every needle hole in the backing. The pairs are arranged in a 10×10 array with spaces 192 and 194 between the pairs of tufts in the X and Y directions respectively to provide a 10×20 array of individual tufts. FIG. 11B represents the base of the tufts of a carpet shown in FIG. 7 made from tuftstring of the invention where P/D<1.0 and the tuftstrings are laid down five to the inch at a spacing 196. FIG. 11B shows the same 10×20 distribution of individual tufts in one square inch of backing as FIG. 11A, but with a distribution of tufts different from the conventional carpet, i.e. rows spaced in the X direction only, versus pairs spaced in both the X and Y directions. The bases of the tufts at the top surface of the support strand are represented by circles 198. The tufts appear as an array of abutted rows of tufts in the Y direction separated in the X direction by spaces 200 and 202 between the tufts on the support strand and between tuftstrings respectively. There is NO SPACE between the abutted tufts in the Y direction since P/D<1.0, i.e. the pitch of the tufts is less than the diameter of the tufts. This is a unique distribution not possible with tufting-machine-made carpet since the needles always must penetrate the backing at spaced apart positions which do not intersect. Such a unique distribution may result in a better concealing of the backing with the tufts, especially when the pile surface structure is laid over curved surfaces in the Y direction.

Figure 5A:
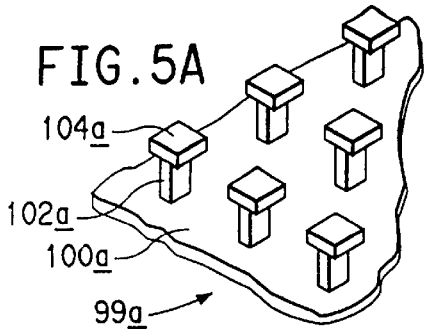
FIGS. 5A through 5D are diagramatic perspective views of substrates having projecting portions with overhanging portions.
Figure 6A:
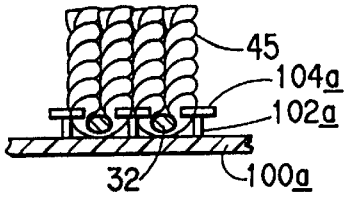
FIGS. 6A through 6D are end views of elongated pile articles attached to the substrates represented in FIGS. 5A through 5D.
Figure 5B:
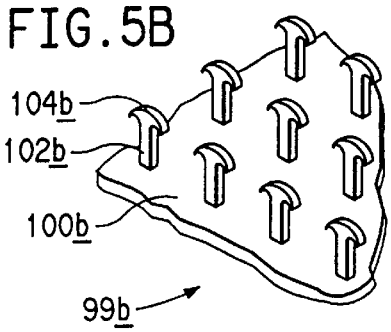
Figure 6B:
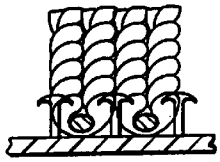
Figure 5C:
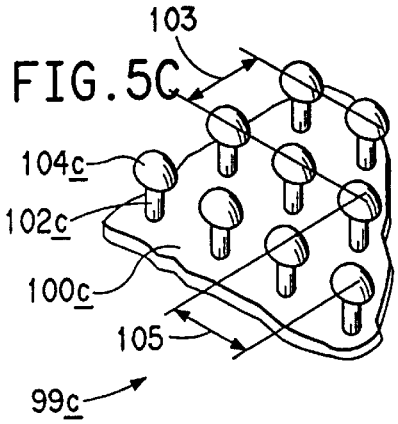
Figure 6C:
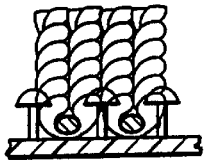
Figure 5D:
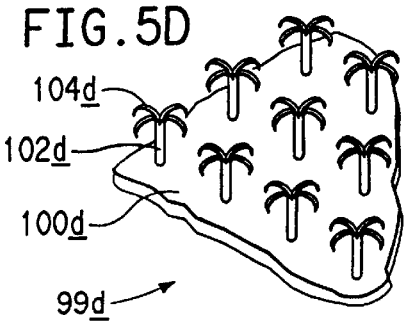
Figure 6D:
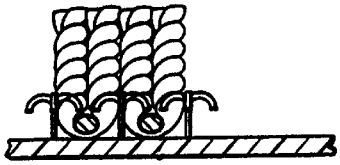

FIGS. 5A through 5D illustrate four different backings 99a, 99b, 99c and 99d useful for assembly with elongated pile articles to make pile surface structures, such as carpets, especially cut pile carpets for floors. The backings may resemble the hook assemblies useful in hook/loop type fasteners such as are described in U.S. Pat. No. 4,775,310 to Fischer incorporated herein by reference. For instance, FIG. 5A shows backing 99a comprising substrate 100a with projecting portions 102a having overhanging portions 104a for engaging the support strand of the elongated pile article. The projecting portions are arranged on the planar substrate in a uniform array in the X and Y directions where the spacing 103 and 105 between the projections (FIG. 15C) is about the same in both directions, and that spacing is wide enough to accept an elongated pile article, such as the elongated pile article of the invention.

FIGS. 6A–6D show end views of the elongated pile article of the invention (tuftstring) inserted in the backings of FIGS. 5A–5D, respectively. Tuftstring 45 is pressed between adjacent projecting portions 102a until the strand 32 is between the overhanging portions 104a and the substrate 100a. The projecting portions are spaced far enough apart to accept, with reasonable force, the strand with the bundle bent around it; and close enough together to securely hold the strand and bundle assembly against accidental removal forces. The spacing is also such that other tuftstring assemblies when placed between adjacent projecting portions form a continuous pile surface structure having uniform tuft distribution throughout the surface. The projecting portions 102a are flexible to aid insertion of the tuftstring assembly. The overhanging portions 104a are designed to engage the tuftstring assembly to resist removal. The substrate, projecting portions and overhanging portions, i.e. the backing, are preferably made from the same materials which are the same as the yarn and strand for low cost recycling, and are preferably molded as a single part. The substrate, such as 100a, is preferably stiff enough to prevent undesired stretching of the pile surface structure during handling. The backing may be assembled with the tuftstring before the backing is mounted to a floor or wall surface, or the backing may first be mounted to the floor/wall surface and the tuftstring assembled in-situ. If the backing is permanently attached to the floor, the need to make it from the same material as the tuftstring assembly is less important since it would not be recycled with the tuftstring. The tuftstring may be placed in the array of projecting portions, such as 102a, in a variety of directions since, in the case of FIG. 5A, the overhanging portions extend from the projecting portions in all directions. Depending on the spacing of the projecting portions and the flexibility of the strand used in the tuftstring, lengths of tuftstring may be arranged in a curved array on the backing, a diagonal array, or an orthogonal array to create different designs with different colored or textured tuftstrings.

Figure 9:
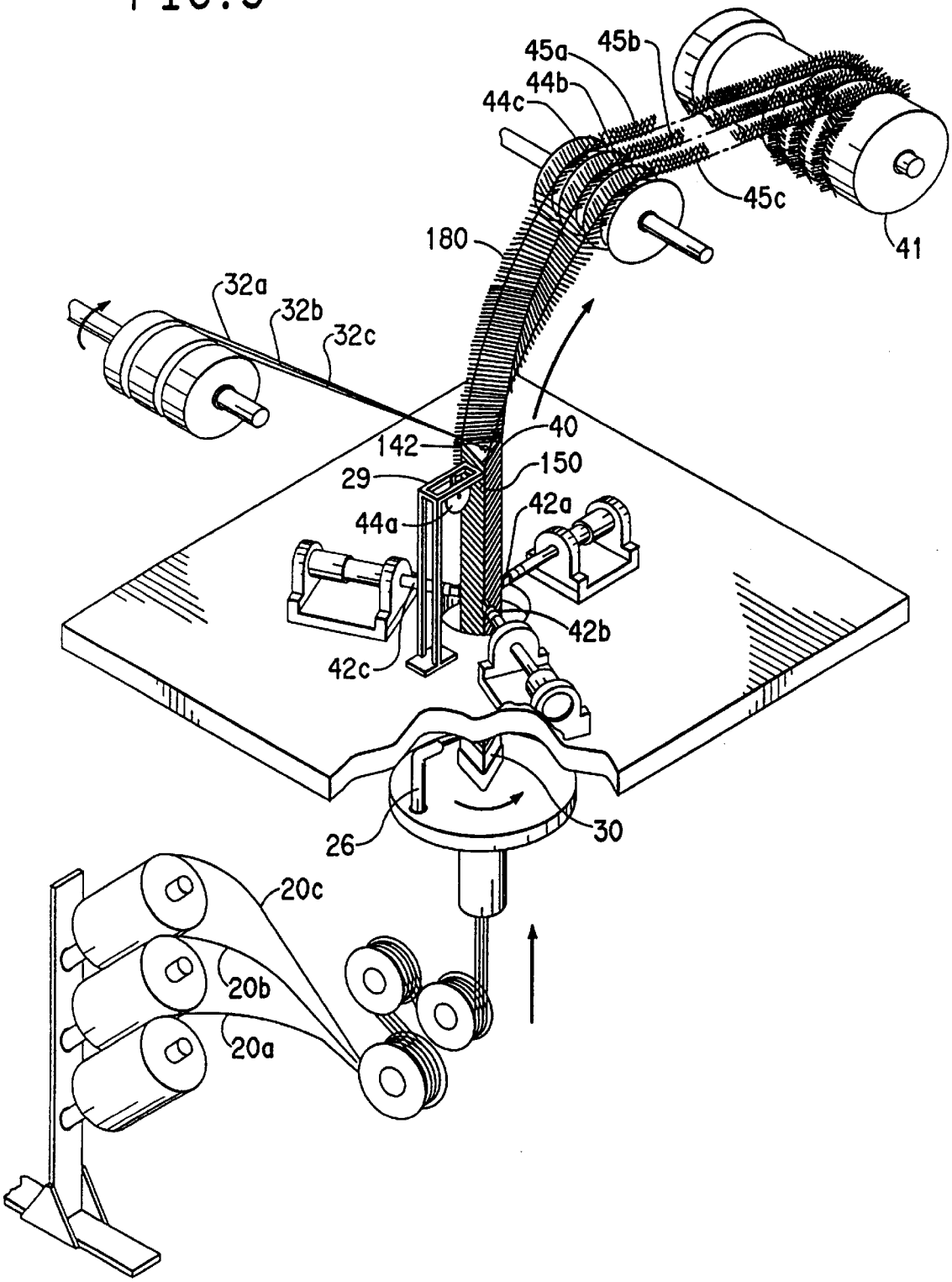
FIG. 9 is a diagramatic view of a process for forming a plurality of pile articles at the same time.

FIG. 9. shows a modified version of FIG. 1 where the mandrel 30 is shown oriented vertically by mandrel support 29, and support strands 32a, 32b and 32c are fed to all three ridges 40, 142 and 150 of mandrel 30. One or several yarn lengths, such as 20a, 20b and 20c are wrapped around the mandrel fed from guide 26. Ultrasonic horns 42a, 42b and 42c are mounted around the mandrel pressing against the yarn on ridges 40, 150 and 142, respectively, to bond the yarn to support strands 32a, 32b and 32c. Cutter 44a cuts the yarn so it can be released from the mandrel as an array 180 of three strands and the connected yarn. Auxiliary cutters 44b and 44c further cut the array to form three elongated pile articles (tuftstrings) 45a, 45b and 45c which are shown being wound together on windup 41. Such an arrangement increases the productivity of the process of FIG. 1. Other variations are possible to produce even more tuftstrings by changing the mandrel to include more ridges.

The yarn used in the elongated pile article is a multifilament strand where the filaments are "connected" to one another. The filaments may be twisted at a level of at least about 1 turn/inch to provide filament crossovers that enhance bonding (especially ultrasonic bonding), or the filaments may be interlaced to provide crossovers. The yarn may comprise two or more strands of multifilaments that are ply-twisted together. The ply-twisting may be a "true" S or Z strand and ply twist or a reverse twist where the S and Z strand and ply twist alternate and there is a bond in the ply and strand twist reversal. Preferably the reverse twisted yarn has a bond in the plied yarn before reversing the twist as described in US Pat. No. 5,012,636. The yarn is preferably made from a thermoplastic polymer having the same composition as the strand so the yarn and strand can be bonded without the use of adhesives. The yarn is preferably made from crimped, bulky, heat-treated filaments commonly used as carpet yarns. The filaments of the yarn may have a variety of cross-sections which may be hollow and contain antistatic agents or the like. The yarn may have a finish applied that aids in ultrasonic bonding. The yarn is preferably a nylon polymer. The yarn may be a poly (aryletherketone) or a polyaramid or meta-aramid that is bondable with solvents, ultrasonics, or heat.

The strand useful in the elongated pile article may have a variety of cross-sectional shapes, such as square, rectangular, elliptical, oblong, round, triangular, multi-lobal, flat ribbon-like, etc. The strand must be bondable to the yarn and have sufficient elongational stability so the bonds are not over-stressed due to stretching of the strand. The strand must provide sufficient stability to the article that it can be handled for its intended use, such as attachment to a backing substrate. The strand may be a monofilament, a composite structure, a sheath/core structure, a reinforced structure, or a twisted multifilament structure. The strand is preferably made from a thermoplastic polymer having the same composition as the attached yarn so the yarn and strand can be bonded without use of adhesives. The strand is preferably a polymer having a molecular structure oriented in the elongated direction, and having a low dimensional change in the direction of orientation due to moisture gain or loss or modest temperature changes. The support strand is preferably a nylon polymer, such as Hyten® made by E. I. du Pont de Nemours and Company.

The aspect ratio (height/width) of the strand should be less than 1 so the tuftstring is stable and will not tend to tip over when mounted in a carpet and subjected to heavy loading due to furniture or high heeled shoes. Also, in the ultrasonic bonding process, a thick strand may absorb more energy than a thin strand so the ultrasonic process is less efficient. The thickness of the strand should not be so thin, however, that it becomes difficult to handle in subsequent processing steps needed to make a carpet. For instance, with the backings shown in FIGS. 5A–5D, some stiffness is required in the strand to permit it to be forced between the overhanging portions attached to the projecting portions. An aspect ratio of between 0.1 and 1.0 should work well for a strand used in the invention. A 56 mils wide strand that is 19 mils thick, giving an aspect ratio of 0.34, worked well assembled in a carpet sample made with the tuftstring of the invention.

Figure 14A:
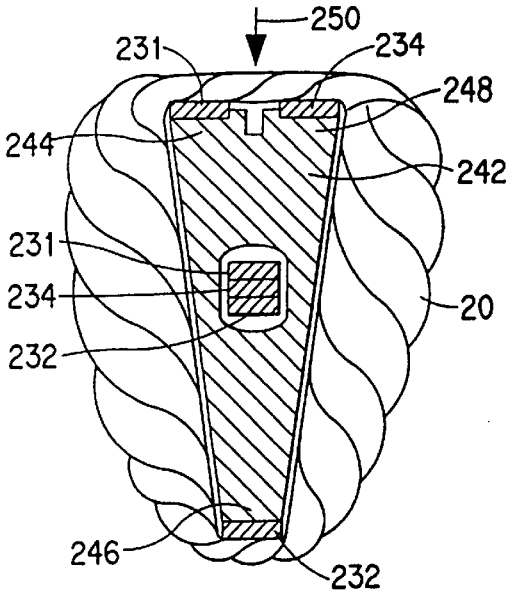
FIG. 14A is a schematic illustration of a way to make a two-loop pile article on a mandrel.
Figure 14B:
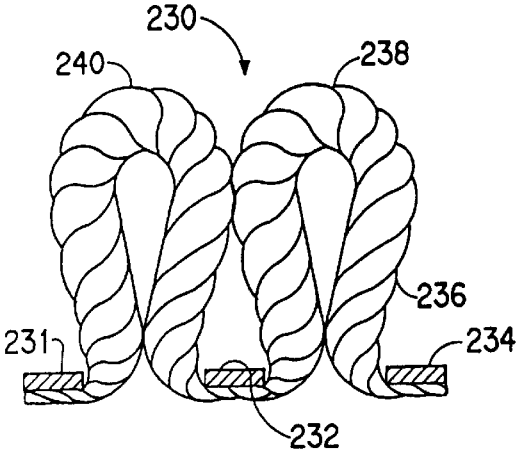
FIG. 14B is a schematic illustration of a two-loop pile article.

There are alternate embodiments of the invention for making loop pile elongated pile articles or a single tuft elongated pile article. FIG. 14B shows the cross section of a two-loop elongated pile article 230 that has three support strands 231, 232, and 234 and a plurality of bundles of yarn, such as bundle 236 arranged in two loops 238 and 240. This article 230 can be combined on a backing with other two-loop articles to make a pile surface structure that has a loop pile surface. The two-loop article 230 can be made on a hollow mandrel shown in cross-section in FIG. 14A. The yarn 20 is fed from a supply and wrapped around mandrel 242 which guides support strands 231, 232, and 234 along ridges 244, 246 and 248 respectively, similar to the system in FIG. 1. The yarn is to be bonded to all three strands at the ridges, and then cut at position 250 between strands 231 and 234 to remove the wrapped yarn from the mandrel. To form the article 230, the strands 231 and 234 are reoriented to be aligned with strand 232 by bending the connecting yarns into loops as shown in FIG. 14B.

Figure 15A:
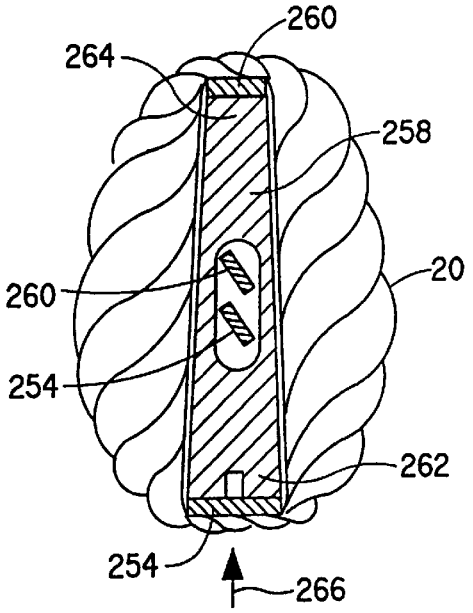
FIG. 15A is a schematic illustration of a way to make a one-loop pile article.
Figure 15B:
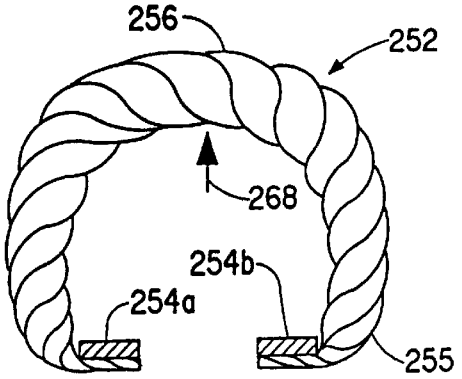
FIG. 15B is a schematic illustration of a one-loop pile article.

Another embodiment of the elongated pile article of the invention for making a one-loop pile article 252 is shown in FIG. 15B, where there are two support strands 254a and 254b, made from halves of what was originally a single strand 254, connected by a loop 256 of yarn bundle 255. Similarly, this one-loop article can be combined on a backing with other one-loop articles 252, or two-loop articles 230, to make a pile surface structure that has a loop pile surface. The one-loop article 252 can be made on a hollow mandrel 258 shown in cross-section in FIG. 15A. The yarn 20 is wrapped around mandrel 258 which guides support strand 254 and carrier strand 260 along ridges 262 and 264 respectively, similar to the system in FIG. 1. The yarn is to be bonded only to strand 254 on ridge 262, and then cut at position 266, thereby severing the bonded yarn and the strand 254 allowing the article 252 to be separated from the mandrel. This divides strand 254 into equal strands 254a and 254b which remain connected by yarn bundle 255. The strands 254a and 254b may be spaced apart as shown in FIG. 15B when mounting them to a backing to form a loop pile surface.

Figure 15C:
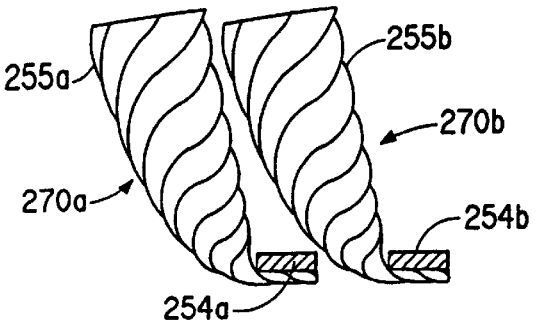
FIG. 15C is a schematic illustration of single tuft cut pile articles formed from the one-loop pile article of FIG. 15B.

Still another embodiment of the elongated pile article of the invention is a cut pile version of the one-loop article 252 shown in FIG. 15C where the loop of FIG. 15B is cut at position 268, thereby producing a pair of one-tuft cut pile articles 270a and 270b having a plurality of bundles having tufts, such as 255a and 255b bonded to support strands 254a and 254b respectively. These may be arranged on a backing as shown in FIG. 15B to make a pile surface structure with a cut pile surface that can have a preferential "grain" to the tufts for special effects and which may be preferred for hiding the strands 254a and 254b from direct overhead view. This one-tuft form of the invention defines the basic "building block" of the elongated pile article of the invention which comprises a strand having a plurality of bundles of filaments secured at a location on the perimeter of the strand, with each bundle having a tuft extending outwardly from the strand and forming an angle with a reference plane tangent to the location, and each bundle having a dense portion where the filaments are bonded together and are bonded to the strand at the location.

Figure 18:
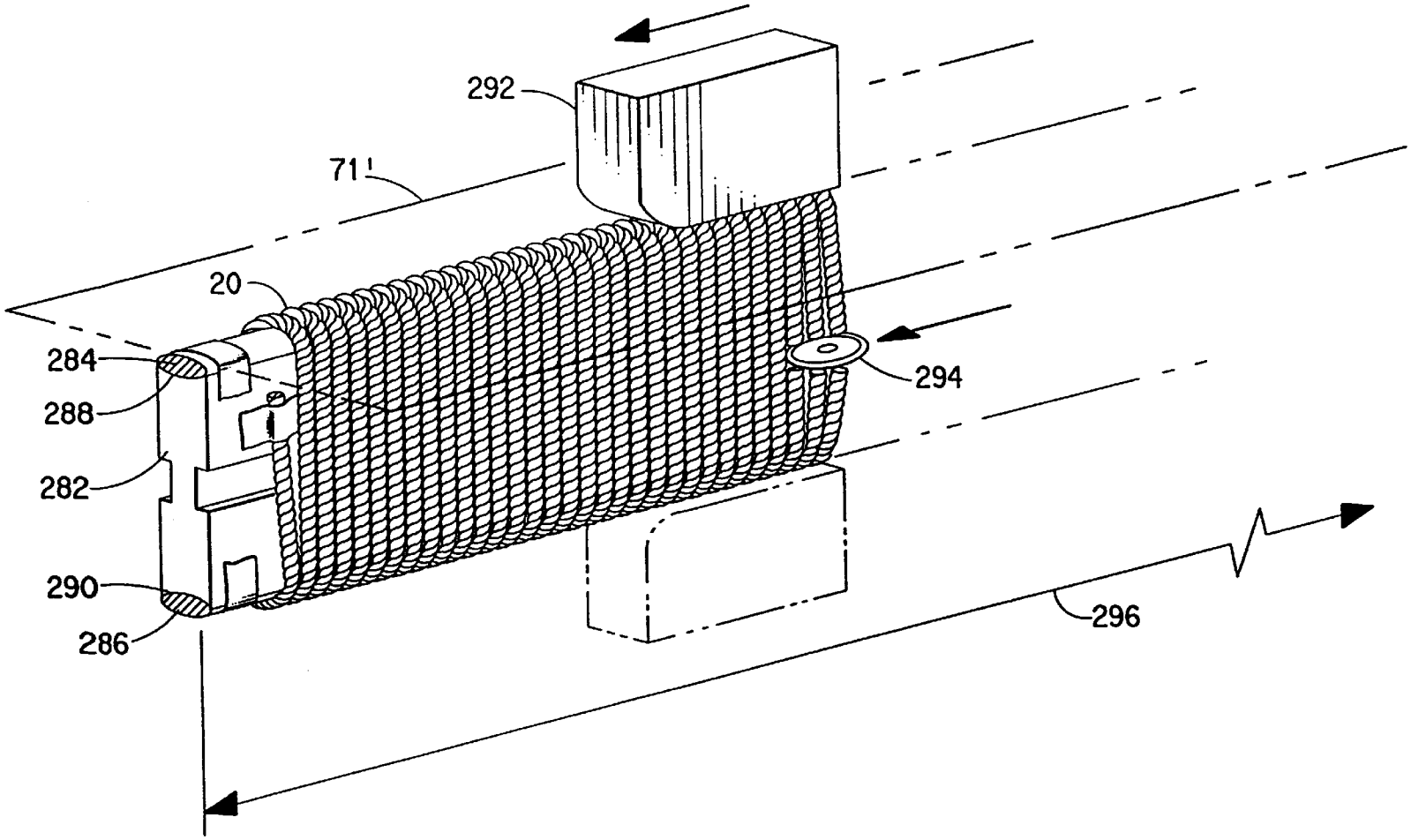
FIG. 18 is a diagrammatic view of a simple process for making the elongated pile article.

Although the invention has been described as it is made on an automated device such as the device of FIG. 1, it is contemplated that the invention can also be made by manual means or any other suitable means. For instance, in FIG. 18, the yarn 20 can be wrapped by hand around a thin rectangular mandrel 282 having support strands 284 and 286 taped or otherwise held in place along ridges 288 and 290 respectively. After the yarn is in place, an ultrasonic horn 292 can be passed along the yarn, bent around ridges 288 and 290, to bond the yarn to strands 284 and 286. The yarn can then be cut by a cutter 294 midway between the strands on both sides of the mandrel 282. In this way two tuftstring assemblies can be easily made. If only a single tuftstring assembly is desired, the second strand is omitted along one ridge and the yarn bundles are cut along that ridge, or the assembled yarn and strand are slid off the mandrel without cutting to form a loop pile tuftstring. The mandrel can have a length 296 that is as wide as the carpet in which the tuftstring is to be used.

To assist in wrapping the yarn, the mandrel may be mounted in a rotatable chuck and the yarn traversed along the rotating mandrel. A lathe with a traversing crosshead may be usefully employed to so place the yarn on the mandrel. In the most general sense, the product can also be made by bending one precut yarn bundle at a time over the edge of the mandrel and bonding the bundle so that the wrapping step is not required. The simpliest method, then for making the elongated pile article of the invention comprises: contacting an elongated support strand with a plurality of bundles of filaments at a location along the perimeter of the strand; bending the bundles of filaments at an angle to a reference plane tangent to their location along the strand; bonding the filaments to each other to form a dense portion in the bundle where the filaments are bonded together and to the strand at the location along the strand.

What is claimed is:

1. A pile article comprising:

a continuous length support strand having a peripheral pile containing surface, and a plurality of pile-forming filaments or bundles of entangled or twisted filaments, each of said bundles having a dense portion of filaments bonded together and secured to said support strand; the securement having been effected while the general angular relationship between the pile-forming filaments or bundle of filaments and the support strand, as defined by a line describing the plane of the general linear direction of the pile-forming filaments or bundle of filaments and the line describing the general plane of the pile contacting surface of the support strand or a plane tangential to that surface, was other than essentially normal, each of said bundles of filaments having a frangible portion adjacent the dense portion and wherein the strength of the frangible portion is less than the strength of the bundle of filaments before bonding.

2. A pile article comprising:

a support strand and a plurality of pile-forming bundles of filaments, each of said bundles having a dense portion of filaments bonded together and secured to said support strand; each of said bundles of filaments having a frangible portion adjacent the dense portion wherein the strength of the frangible portion is less than the strength of the bundle of filaments before bonding.

3. The pile article of claim 2, wherein each of said plurality of bundles has a diameter and is bonded along the support strand at a distance from adjacent bundles that defines a pitch between bundles, and wherein said pitch is less than an average of said bundle diameters.

4. The pile article of claim 2, wherein each of said plurality of bundles has a diameter, and said support strand has a width which is less than an average of said yarn bundle diameters.

5. The pile article of claim 3, wherein the ratio between said pitch and said average bundle diameter is less than the ratio of said average bundle diameter to the width of the strand.

6. The pile article of claim 3, wherein the support strand has a projected area defined by the width times a unit of strand length, and the plurality of bundles secured along the unit of strand length has a total projected tuft area defined by the number of tufts extending from the strand along the unit of strand length times the area of said average bundle diameter, whereby the ratio of the projected strand area to the total projected tuft area is less than 1.0 and the ratio of the bundle pitch to the average bundle diameter is less than 2.0 and the ratio of the strand width to the average bundle diameter is less than 4.0.

7. The pile article of claim 2, wherein each bundle is in the form of a pair of tufts extending outwardly from said strand.

8. The pile article of claim 2, wherein each bundle is in the form of a single tuft extending outwardly from said strand.

9. The pile article of claim 2, wherein each bundle is in the form of a loop.

10. The pile article of claim 2, wherein there are a plurality of support strands arranged parallel to each other and with adjacent strands connected by said bundles, with each bundle in the form of a loop.

11. The pile article of claim 2, including a substrate having projecting portions wherein said projecting portions have overhanging portions engaging said pile articles to attach the pile articles to the substrate.

12. A method for making an elongated pile article comprising:

feeding a continuous length of a bundle of filaments under tension to an eccentric guide;

rotating said eccentric guide to wrap said bundle of filaments around a stationary hollow mandrel to form loops of said bundles with said hollow mandrel having a plurality of elongated ridges;

feeding a continuous support strand of material along at least one of said ridges and in contact with the bundle of filaments being wrapped on the mandrel;

feeding carrier strands for said loops through the hollow portion of said mandrel and guiding the carrier strands along each of said ridges between said loops and said stationary hollow mandrel, at least one of said carrier strands may be said support strand when said support strand is placed between said loops and said stationary mandrel;

transporting said loops under a bonding means aligned with a ridge and said support strand by propelling said carrier strands along said ridges of said stationary mandrel;

bonding the filaments in the bundle to each other and to the support strand while the loops are bent over the ridge;

cutting said loops to form the elongated pile article; and forwarding said elongated pile article for further processing.

13. The method as defined in claim 12, wherein the bonding of the filaments to each other and to the support strand is accomplished by an ultrasonic bonding process in one step and wherein the stationary hollow mandrel acts as an ultrasonic anvil.

14. The method as defined in claim 12, wherein said support strand is located between said ridge and said bundle of filaments wrapped on said mandrel.

15. The method as defined in claim 12, wherein said support strand is located along the ridge between said bundle of filaments wrapped on said mandrel and said bonding means.

16. A pile article comprising:

a continuous length support strand having a peripheral surface;

a plurality of "U" shaped bundles of filaments defining a pair of upstanding tufts, the tufts bent at an acute angle at a base and extending upwardly therefrom in an essentially non-curvilinear manner and the tufts defining a spaced distance therebetween adjacent said base, each of said bundles having a dense portion of filaments bonded together and secured to the peripheral surface of the support strand at said base, said support strand having a width that is equal to or less than the distance between the upstanding tufts.

17. A pile article comprising:

a continuous length support strand having a peripheral surface;

a plurality of "U" shaped bundles of filaments defining a pair of upstanding tufts, the tufts bent at an acute angle at a base and extending upwardly therefrom in an essentially non-curvilinear manner, each of said bundles having a dense portion of filaments bonded together and secured to the peripheral surface of the support strand located within and at the base of said "U".

18. The pile article of claims 16 or 17, wherein there is a second support strand with "U" shaped bundles bonded thereto adjacent said first mentioned support strand and wherein there are yarns connecting the adjacent "U" shaped bundles that are bent in the form of a loop.

19. A pile article comprising:

a continuous length support strand having a peripheral surface;

a plurality of bundles of filaments defining a plurality of upstanding tufts, the tufts bent at an acute angle at a base and extending upwardly therefrom in an essentially non-curvilinear manner, each of said bundles having a dense portion of filaments defined by a width dimension bonded together and secured to the peripheral surface of the support strand at said base, said support strand having width that approaches the width of the dense portion.

20. A pile article comprising:

a support strand having a surface of thermoplastic polymer;

a plurality of bundles of filaments of thermoplastic polymer, each bundle defining a pair of tufts, the tufts in said pair bent at an angle at a base and extending upwardly therefrom, the tufts defining a spaced distance therebetween adjacent said base, each of said bundles having a dense portion of filaments bonded together and secured to the surface of the support strand at said base by fusion of the thermoplastic polymer of the support strand and the filaments, said support strand having a width that is equal to or less than the distance between the tufts in said pair.

21. The pile article of claim 20, wherein the filaments of each bundle are connected to other filaments throughout the bundle resulting in a cohesion between the filaments.

22. The pile article of claim 20, wherein said surface of said strand and said filaments are of the same thermoplastic polymer.

23. The pile article of claim 20, wherein the bundles of filaments are ply-twisted and heat set.

24. The pile article of claim 20, wherein said surface of said strand and said filaments of said bundle are nylon polymer.

25. The pile article of claim 20, wherein said surface of said strand and said filaments of said bundle are polypropylene.

26. A method for making a pile article comprising:

feeding a bundle of filaments under tension around a stationary hollow mandrel to form loops of said bundle, said hollow mandrel having a plurality of strand guiding grooves disposed longitudinally along the surface of the mandrel;

feeding a support strand of material aligned with at least one of said guiding grooves and in contact with the bundle of filaments being wrapped on the mandrel;

feeding carrier strands for said loops through the hollow portion of said mandrel and guiding the carrier strands along each of said guiding grooves between said loops and said stationary hollow mandrel, at least one of said carrier strands may be said support strand when said support strand is placed between said loops and said stationary mandrel;

transporting said loops under a bonding means aligned with a guiding groove and said support strand by propelling said carrier strands along said guiding grooves of said stationary mandrel;

bonding the filaments in the bundle to each other and to the support strand;

cutting said loop to form the pile article; and forwarding said pile article off the mandrel.

27. The method as defined in claim 26, wherein the bonding of the filaments to each other and to the support strand is accomplished by an ultrasonic bonding process in one step and wherein the stationary hollow mandrel acts as an ultrasonic anvil.

28. The method as defined in claim 26, wherein said support strand is located between said guiding groove and said bundle of filaments wrapped on said mandrel.

29. The method as defined in claim 26, wherein said support strand is located along the guiding groove between said bundle of filaments wrapped on said mandrel and said bonding means.

30. A method of making a pile article, comprising:

placing a support strand in a groove on a stationary mandrel;

contacting the strand with a plurality of bundles of filaments that are connected to other filaments throughout the bundle resulting in a cohesion between the filaments;

compacting the filaments where they contact the strand; and bonding the filaments to the strand by contacting the filaments with an ultrasonic horn and squeezing the filaments and strand between said ultrasonic horn and the mandrel acting as an ultrasonic anvil.

31. A method of making a pile article, comprising:

feeding a bundle of filaments under tension around a stationary hollow mandrel to form loops of said bundle around said mandrel;

feeding a support strand of material along said mandrel and in contact with the bundle of filaments being wrapped on the mandrel;

feeding carrier strands for said loops through the hollow portion of said mandrel and guiding the carrier strands along said mandrel between said loops and said stationary hollow mandrel, at least one of said carrier strands may be said support strand when said support strand is placed between said loops and said stationary mandrel; and bonding the filaments to each other and to the strand by using an ultrasonic bonding process wherein the mandrel acts as an ultrasonic anvil.

32. A pile surface structure comprising:

a backing substrate having a plurality of projections extending out from the surface with the projections terminating in overhanging portions;

a plurality of pile articles, each comprising a support strand having a surface of thermoplastic polymer and having attached thereto a plurality of bundles of filaments of thermoplastic polymer, the bundles in the form of a "U" shape which is attached to the support strand at the base of the "U" shape by fusion bonding, the bundle opposite the base defining a tuft;

said pile articles placed one next to the other on said substrate with the support strand located between the projections and retained between the overhanging portions and the substrate with the base of the "U" shaped bundles adjacent the substrate, and the tuft extending beyond the overhanging portions.

33. The pile surface structure of claims 32 or 34, wherein said surface of said strand and said filaments of said bundle are of the same thermoplastic polymer.

34. The pile surface structure of claims 32 or 34, wherein said surface of said strand and said filaments of said bundle are nylon polymer.

35. The pile surface structure of claims 32 or 34, wherein said surface of said strand and said filaments of said bundle are polypropylene.

36. A pile surface structure, comprising:

a backing substrate;

a plurality of pile articles, each comprising a strand having a surface of thermoplastic polymer and having attached thereto a plurality of bundles of filaments of thermoplastic polymer, the bundles in the form of a "U" shape which is attached to the support strand at the base of the "U" shape by fusion, the bundle opposite the base defining a tuft;

said pile articles placed one next to the other and attached to the backing substrate with the base of the "U" shaped bundles adjacent the substrate and the tuft extending away from the substrate.

37. A pile surface structure comprising:

a backing substrate;

a plurality of pile articles of claims 2 or 20, each comprising a rapport strand and a plurality of bundles of filaments.

38. The pile surface structure of claim 37, wherein the filament bundles, the support strands, and the backing substrate are comprised of the same thermoplastic polymer to enhance recycling the pile surface structure.

39. The pile surface structure of claim 38, wherein the thermoplastic polymer is nylon.

40. The pile surface structure of claim 38, wherein the thermoplastic polymer is polypropylene.

*41. A pile article comprising:*

*a support strand and a plurality of pile-forming yarns comprising filaments, each of said yarns having a dense portion of filaments bonded together and secured to said support strand; each of said yarns having a frangible portion adjacent the dense portion wherein the strength of the frangible portion is less than the strength of the yarn before bonding.*

*42. The pile article of claim 41, wherein each yarn is in the form of a pair of tufts extending outwardly form said strand.*

*43. The pile article of claim 41, wherein each yarn is in the form of a loop.*

*44. A pile article comprising:*

*a support strand having a surface of thermoplastic polymer;*

*a plurality of pile-forming yarns comprising filaments of thermoplastic polymer, each yarn defining a pair of tufts, the tufts in said pair bent at an angle at a base and extending upwardly therefrom, the tufts defining a spaced distance therebetween adjacent said base,*

*each of said yarns having a dense portion of filaments bonded together and secured to the surface of said support strand at said base by fusion of the thermoplastic polymer of the support strand and the filaments; said support strand having a width that is equal to or less than the distance between the tufts in said pair.*

*45. The pile article of claim 44, wherein said surface of said strand and said filaments are of the same thermoplastic polymer.*

*46. The pile article of claim 44, wherein said surface of said strand and said filaments of said yarn are nylon polymer.*

*47. The pile article of claim 44, wherein said surface of said strand and said filaments of said yarn are polypropylene.*

*48. A method of making a pile article comprising:*

*feeding a yarn comprising filaments under tension around a stationary hollow mandrel to form loops of said yarn, said hollow mandrel having a plurality of strand guiding grooves disposed longitudinally along the surface of the mandrel;*

*feeding a support strand of material aligned with at least one of said guiding grooves and in contact with the yarn filaments being wrapped on the mandrel;*

*feeding carrier strands for said loops through the hollow portion of said mandrel and guiding the carrier strands along each of said guiding grooves between said loops and said stationary hollow mandrel, at least one of said carrier strands may be said support strand when said support strand is placed between said loops and said stationary mandrel;*

*transporting said loops under a bonding means aligned with a guiding groove and said support strand by propelling said carrier strands along said guiding grooves of said stationary mandrel;*

*bonding the filaments in the yarn to each other and to the support strand;*

*cutting said loop to form the pile article; and*

*forwarding said pile article off the mandrel.*

*49. The method as defined in claim 48 wherein the bonding of the filaments to each other and to the support strand is accomplished by an ultrasonic bonding process in one step and wherein the stationary hollow mandrel acts as an ultrasonic anvil.*

*50. The method as defined in claim 48 wherein said support strand is located between said guiding groove and said yarn filaments wrapped on said mandrel.*

*51. The method as defined in claim 48 wherein said support strand is located along the guiding groove between said yarn filaments wrapped on said mandrel and said bonding means.*

*52. A method of making a pile article comprising:*

*placing a support strand in a groove on a stationary mandrel;*

*contacting the strand with a plurality of yarns comprising filaments of thermoplastic polymer;*

*compacting the filaments where they contact the strand; and*

*bonding the filaments to the strand by contacting the filaments with an ultrasonic horn and squeezing the filaments and strand between said ultrasonic horn and the mandrel acting as an ultrasonic anvil.*

*53. A method of making a pile article comprising:*

*feeding a yarn comprising filaments under tension around a stationary hollow mandrel to form loops of said yarn around said mandrel;*

*feeding a support strand of material along said mandrel and in contact with the yarn being wrapped on the mandrel;*

*feeding carrier strands for said loops through the hollow portion of said mandrel and guiding the carrier strands along said mandrel between said loops and said stationary hollow mandrel, at least one of said carrier strands may be said support strand when said support strand is placed between said loops and said stationary mandrel;*

*bonding the filaments to each other and to the strand by using an ultrasonic bonding process wherein the mandrel acts as an ultrasonic anvil.*

*54. A pile surface structure, comprising:*

*a backing substrate;*

*a plurality of pile articles, each comprising a strand having a surface of thermoplastic polymer and having attached thereto yarns comprising filaments of thermoplastic polymer, the yarns in the form of a "U" shape which is attached to the support strand at the base of the "U" shape by fusion, the yarn opposite the base defining a tuft;*

*said pile articles placed one next to the other and attached to the backing substrate with the base of the "U" shaped yarns adjacent the substrate and the tuft extending away from the substrate.*

*55. A pile surface structure comprising:*

*a backing substrate;*

*a plurality of pile articles of claims 41 or 44 attached to the backing substrate, each pile article comprising a support strand and a plurality of yarns comprising filaments.*

*56. The pile surface structure of claim 55 wherein the yarn filaments, the support strands, and the backing substrate are comprised of the same thermoplastic polymer to enhance recycling the pile surface structure.*

*57. The pile surface structure of claim 56 wherein the thermoplastic polymer is nylon.*

*58. The pile surface structure of claim 56, wherein the thermoplastic polymer is polypropylene.*

* * * * *